(12) United States Patent
Bruegman et al.

(10) Patent No.: US 10,413,794 B2
(45) Date of Patent: Sep. 17, 2019

(54) ROPING DUMMY WITH WASHOUT SIMULATION AND NECK PIVOT ACTION

(71) Applicant: HEEL-O-MATIC, INC., Deerfield, IL (US)

(72) Inventors: Brandon Bruegman, Eaton, CO (US); Joel Stafford, Westminster, CO (US); Joshua Love, Loveland, CO (US)

(73) Assignee: HEEL-O-MATIC, INC., Deerfield, IL (US)

( * ) Notice: Subject to any disclaimer, the term of this patent is extended or adjusted under 35 U.S.C. 154(b) by 151 days.

(21) Appl. No.: 14/815,521

(22) Filed: Jul. 31, 2015

(65) Prior Publication Data

US 2016/0029596 A1    Feb. 4, 2016

Related U.S. Application Data

(60) Provisional application No. 62/150,950, filed on Apr. 22, 2015, provisional application No. 62/032,417, filed on Aug. 1, 2014.

(51) Int. Cl.
*A63B 69/00* (2006.01)
*A01K 15/02* (2006.01)
(Continued)

(52) U.S. Cl.
CPC .......... *A63B 69/0068* (2013.01); *A01K 15/02* (2013.01); *A01K 29/00* (2013.01);
(Continued)

(58) Field of Classification Search
CPC .... A01K 15/02; A01K 29/00; A63B 69/0068; G09B 9/00; G09B 9/24
(Continued)

(56) References Cited

U.S. PATENT DOCUMENTS 2,982,559 A * 5/1961 Hawkins ................ A63G 19/06
  280/1.182
3,776,553 A * 12/1973 Kelton ................... A63G 19/20
  273/339
(Continued)

OTHER PUBLICATIONS

Written Opinion of International Application No. PCT/US 15/43464 dated Nov. 4, 2015—7 pages.
(Continued)

*Primary Examiner* — Lisa L Tsang
(74) *Attorney, Agent, or Firm* — K&L Gates LLP

(57) ABSTRACT

A roping simulator (sometimes referred to as a roping or practice dummy or sled) that is designed to mimic the natural movements and anatomy of roping cattle. Embodiments of the instant disclosure mimic the anatomy and movement of a roping cattle when the animal "washes out," meaning that its back end slips and pivots during a turn. In various embodiments, the disclosed roping simulator also includes a feature whereby the head portion of the dummy rotates and pivots downward when a force is applied by a rope, simulating head movement of a live animal. In one embodiment, a sled assembly and a body assembly are connected to one another to form the roping simulator. The sled assembly is the component that makes contact with the ground. The body assembly is the component that provides roping targets, and that simulates the movement of live cattle.

12 Claims, 20 Drawing Sheets

(51) Int. Cl.
*A01K 29/00* (2006.01)
*G09B 9/00* (2006.01)
*G09B 19/24* (2006.01)

(52) U.S. Cl.
CPC .............. *G09B 9/00* (2013.01); *G09B 9/006* (2013.01); *G09B 19/24* (2013.01)

(58) Field of Classification Search
USPC .......................................... 119/839; 434/225
See application file for complete search history.

(56) References Cited

U.S. PATENT DOCUMENTS

| | | | |
|---|---|---|---|
| 5,286,032 A | | 2/1994 | Spencer |
| 5,429,515 A | * | 7/1995 | Greenwood ........... A63B 69/04 434/247 |
| 5,709,386 A | * | 1/1998 | Nelson ............... A63B 69/0068 273/338 |
| 7,175,440 B1 | * | 2/2007 | Bateman ............... A63B 69/04 434/247 |
| 7,293,775 B1 | | 11/2007 | Donnelly |
| 8,297,980 B2 | * | 10/2012 | Reynolds ................. G09B 9/00 119/712 |
| 8,579,293 B1 | | 11/2013 | Sellers et al. |
| 9,629,337 B1 | * | 4/2017 | Dixon .................... A01K 15/02 |
| 2005/0282128 A1 | | 12/2005 | Brinkerhoff et al. |

OTHER PUBLICATIONS

International Search Report for International Application No. PCT/US 15/43464 dated Nov. 4, 2015—6 pages.

* cited by examiner

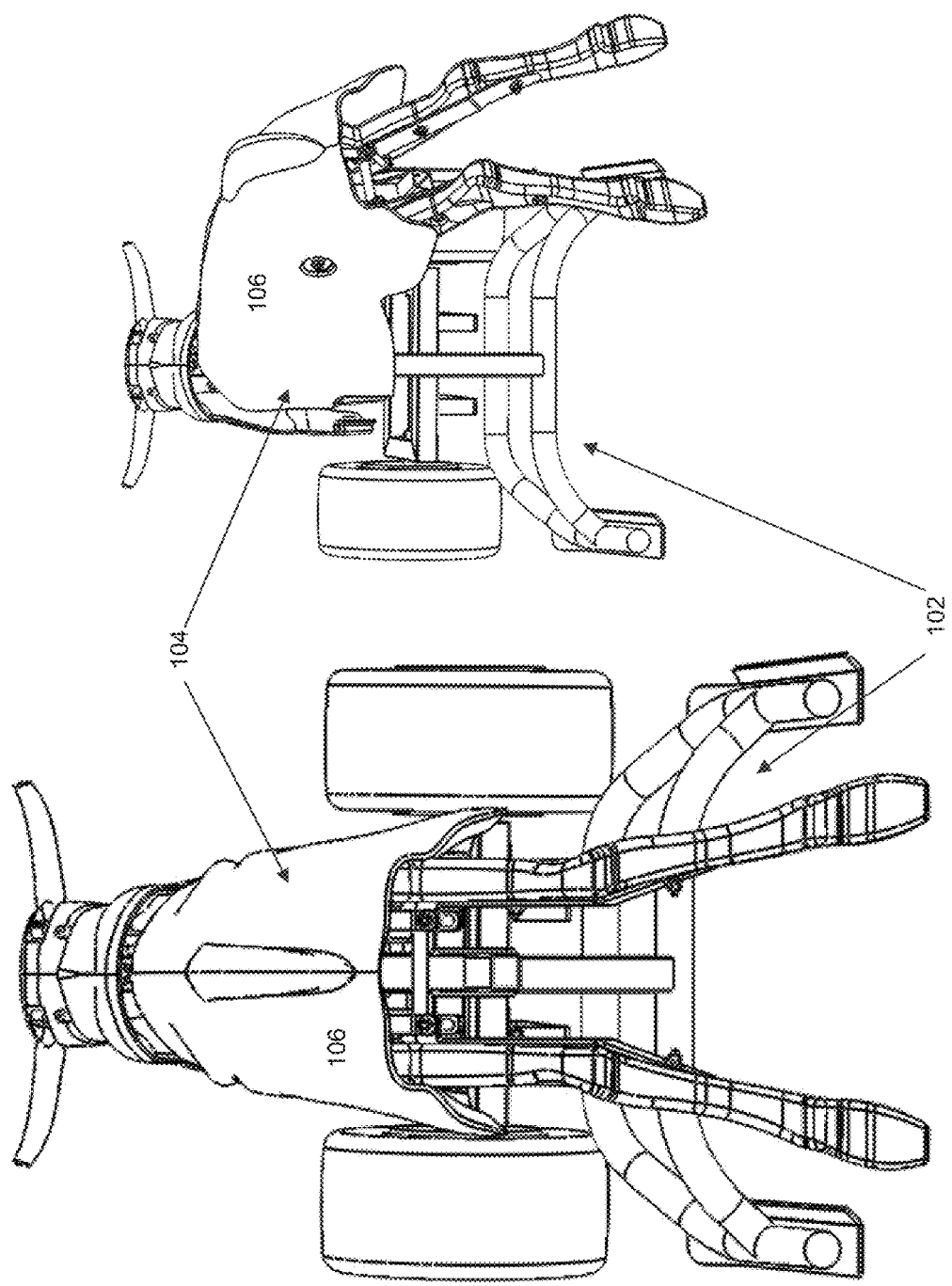

ROPING DUMMY WITH WASHOUT SIMULATION AND NECK PIVOT ACTION

PRIORITY CLAIM

This application is a non-provisional of, and claims priority to and the benefit of U.S. Provisional Patent Application No. 62/032,417, filed on Aug. 1, 2014, and U.S. Provisional Patent Application No. 62/150,950, filed on Apr. 22, 2015, the entire contents of which are incorporated herein by reference in their entirety.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

TECHNICAL FIELD

The present disclosure relates generally to roping simulators (sometimes referred to as dummies) for enabling users to practice roping cattle or other animals, and more specifically to roping simulators configured such that a body portion can pivot to simulate "washout" action and/or a head or neck portion can pivot and rotate laterally and downward to simulate head/shoulder movement encountered while roping live animals.

BACKGROUND

Known mechanical animal simulator devices enable individuals to practice roping skills (such as steer roping and/or Team Roping skills) without requiring the use of live animals. Such devices attempt to replicate the appearance, movement, and other pertinent characteristics of cattle or other rodeo animals. These devices can, for example, be towed behind one or more motorized vehicles (such as four-wheelers or ATVs), and individuals wishing to practice roping skills can chase the devices while mounted on a horse. By attempting to rope head or leg portions of these devices, individuals can attempt to hone their roping skills.

Roping simulators possess several advantages. First, they do not require the use of live animals as targets for roping practice. Accordingly, the risk of injury to animals and humans is substantially reduced. Second, because known devices can be dragged or towed behind motorized vehicles, the path of such devices can be controlled by the driver of the vehicle, enabling the individual chasing the device to focus on roping techniques without needing to be concerned with unexpected changes of direction. Third, known roping simulators enable as much or as little practice as desired, without regard for the temperament or fatigue of a target animal.

Nonetheless, known roping simulators are deficient in several ways.

Known roping simulators do not accurately mimic the movement of the bodies of live animals, and as such do not provide as robust a roping simulator as desired. For example, known roping simulators do not accurately simulate the hinging motion between the body and head/shoulders of an animal that is frequently encountered when attempting to rope live animals that reach the corner of a run. That is, known simulators do not accurately simulate a "washout" position of the body of an animal that frequently occurs in live animal roping exercises when an animal turns a corner. Known roping simulators also do not mimic the way in which a live animal's neck and shoulders rotate and pivot downward as a rope around the animal's neck is pulled by a roper.

Moreover, because known roping simulators do not accurately mimic the pivoting or hinging of the bodies of live animals with respect to their head and shoulders, known roping simulators do not simulate the way in which a live animal's head and body returns to an unhinged or straight position as the animal in tow exits a corner and resumes forward motion with the animal in tow. That is, known simulators do not replicate the return of an animal's body from a "washout" position, which also frequently occurs in live animal roping exercises as an animal resumes forward motion following a turn. Known roping simulators also do not simulate the tendency of a live animal's head and shoulders to return from a rotated, pivoted position to a straight-ahead position as tension is released from the rope.

Finally, known roping simulators are deficient because the head and shoulder portions of such simulators (the roping target for an individual practicing with the simulator) do not pivot or move together, both rotationally and downward, with respect to the body of the simulator. This means that known roping simulators do not provide realistic simulations of the motion of the head and shoulders of an animal encountered after roping a live animal with a rope around its head.

What is needed is a roping simulator that more accurately simulates the movements encountered when attempting to rope a live animal. More specifically, what is needed is a roping simulator with a body portion spring-biased to be able to hinge into a "washout" position as the device is pulled into a corner, and to return from the "washout" position to its normal, straight position as the device is pulled forward following the corner.

What is also needed is a roping simulator that accurately simulates the head and shoulder rotation and pivot encountered by ropers when attempting to rope live animals. More specifically, what is also needed is a roping simulator in which when a rope engaged with the head portion of the simulator is pulled, the head, neck, and shoulders of the simulator rotate and pivot downward to simulate the movement of the head, neck, and shoulders of a live animal.

SUMMARY

The instant disclosure is directed to a roping simulator (sometimes referred to as a roping or practice dummy or sled) that is designed to mimic the natural movements and anatomy of roping animals such as cattle. Embodiments of the instant disclosure mimic the anatomy and movement of a roping cattle when the animal "washes out," meaning that its back end slips and pivots during a turn. For example, in some embodiments, the disclosed roping simulator includes a body portion that pivots or hinges to a "washed out" position and is urged to return to a straight-ahead position in the absence of contrary forces. In various embodiments, the disclosed roping simulator also includes a feature whereby the head portion of the dummy rotates and pivots downward when a force is applied by a rope, simulating head movement of a live animal. In one embodiment, a sled assembly and a body assembly are connected to one another to form the roping simulator. In this embodiment, the sled assembly is the component that makes contact with the ground and thus slides along the ground when pulled. The sled assembly can be pulled, for example, by a four-wheeler or an ATV. The body assembly is the component that provides roping targets, and that simulates the movement of live cattle. In one embodiment, a leg portion of the roping simulator further simulates the motion of a live animal by providing two simulated leg components that can be pulled together when roped and are urged apart, to a neutral position, by springs or other urging members.

Embodiments of the apparatus disclosed herein more accurately simulate certain movements encountered when attempting to rope a live animal. In some embodiments, the disclosed apparatus is a roping simulator with a body portion spring-biased to be able to hinge into a "washout" position as the device is pulled into a corner, and to return from the "washout" position to its normal, straight position as the device is pulled forward following the corner.

In some embodiments, the disclosed apparatus more accurately simulates the head and shoulder rotation and pivot encountered by ropers when attempting to rope live animals. In such embodiments, the disclosed apparatus is a roping simulator in which when a rope engaged with the head portion of the simulator is pulled, the head, neck, and shoulders of the simulator rotate and pivot downward to simulate the movement of the head, neck, and shoulders of a live animal.

In an exemplary embodiment, the disclosed roping simulator includes a body portion having a rear portion resembling the appearance of a body of a roping animal, the rear portion configured to pivot in a first direction when a centrifugal force is generated, a head portion resembling an appearance of a head of the roping animal, the head portion configured to pivot in a second direction when a force other than the centrifugal force is applied to the head portion, the head portion further including a first head portion pivot providing for rotational movement of the head portion and a second head portion pivot providing for downward movement of the head portion. In this embodiment, the body portion of the roping simulator also includes at least one pivot stop to limit the amount the rear portion can pivot, a body return spring to bias the body portion into a body non-pivoted position, and a head return spring to bias the head portion into a head non-pivoted position, wherein when the body portion is in the body non-pivoted position and the head portion is in the head non-pivoted position, the body portion and the head portion are aligned with one another. Finally, in this embodiment, the disclosed roping simulator includes a sled portion connectable to a vehicle to enable the vehicle to pull the sled portion and the body portion to simulate forward movement of a roping animal.

BRIEF DESCRIPTION OF THE FIGURES

FIG. 1 illustrates an embodiment of the disclosed roping simulator in a straight, or "neutral," position.

FIG. 2 illustrates an embodiment of the disclosed roping simulator in a "washed-out" or angled position.

DETAILED DESCRIPTION

Figure 3:
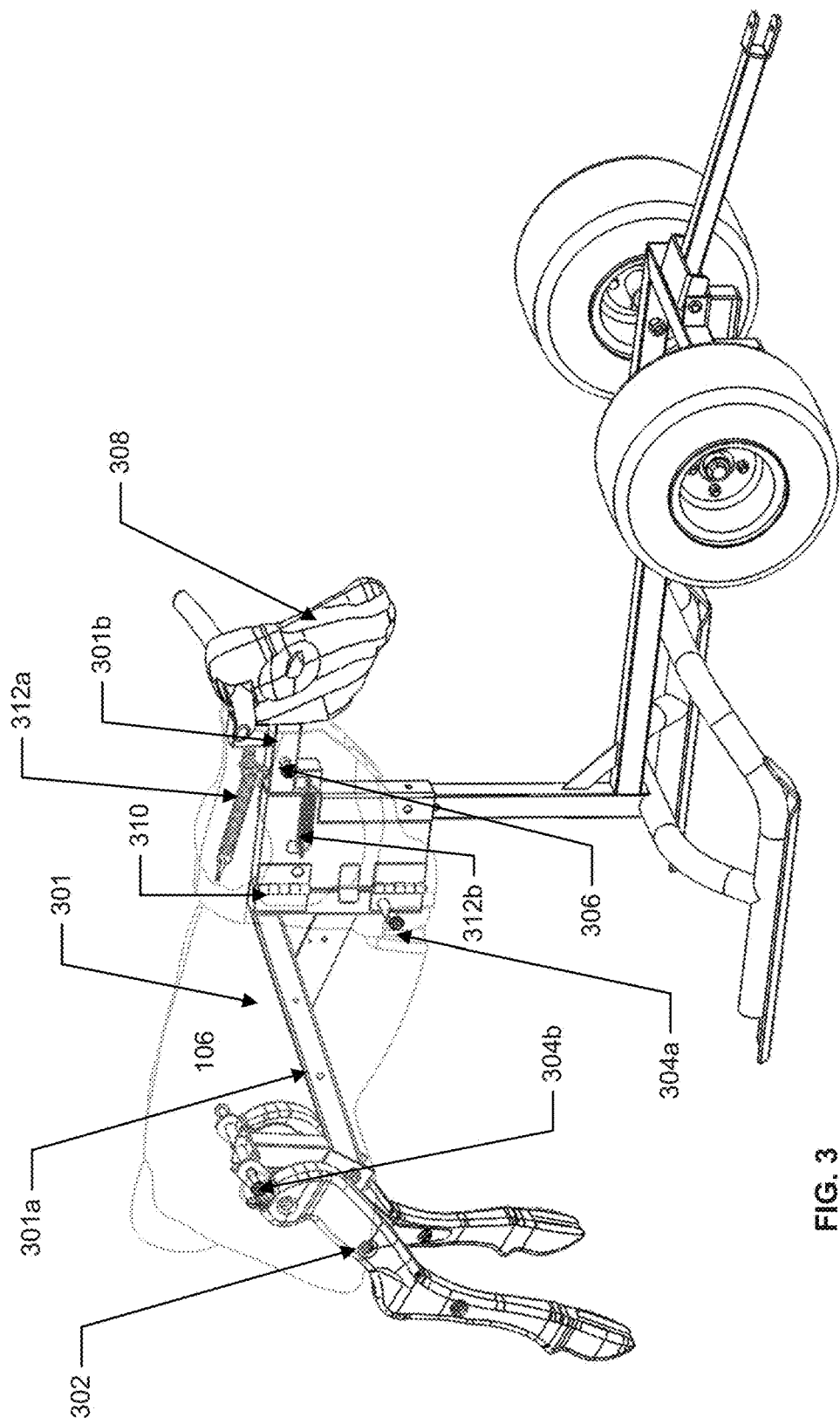
FIGS. 3, 3a, and 3b illustrate differing levels of detail of an embodiment of an internal frame of the disclosed roping simulator that provide for the described washout movement.

The instant disclosure is directed to a roping simulator (sometimes referred to as a roping or practice dummy or sled) that is designed to mimic the natural movements and anatomy of a roping animal. Embodiments of the instant disclosure mimic the anatomy and movement of a roping cattle when the animal "washes out," meaning that its back end slips and pivots during a turn. In various embodiments, the disclosed roping simulator also includes a feature whereby the rear legs of the dummy can be resiliently biased toward one another to simulate the capability of an animal's rear legs to be pulled together when roped. In one embodiment, a sled assembly and a body assembly are connected to one another to form the roping simulator. In this embodiment, the sled assembly is the component that makes contact with the ground. Also in this embodiment, the body assembly is the component that provides roping targets, and that simulates the movement of live cattle.

To simulate the movements of an animal, the rear of the body assembly in one embodiment includes a hinge that allows the back end to swing freely in one direction as simulator is dragged or pulled into the corner of its run. As the machine turns, centrifugal force causes the dummy's body to pivot to roughly a maximum of 70 degrees, while a series of springs forces or urges the pivoted body portion to return to its original position after the machine resumes a forward line motion.

In one embodiment, to further increase the realism of the disclosed machine, the roping simulator has an additional pivot holding a front-facing head portion that enables the user to pull the head portion (including a shoulder portion of the roping simulator) in the opposite direction from the body, pivoting approximately 25 degrees. In this embodiment, the additional pivot enables the head and shoulders of the simulator to pivot against a force urging those portions back into a straight position.

In a further embodiment, when a rope engaged with the head portion of the simulator is pulled, the head, neck, and shoulders of the simulator rotate and pivot downward to simulate the movement of the head, neck, and shoulders of a live animal. In such an embodiment, the disclosed roping simulator includes a pair of pivot points in the head portion of the simulator to allow for lifelike head movement when a roper engages a rope with the horns of the simulator. In this embodiment, a first pivot provides for rotational movement of the head, and a second pivot provides for downward pivoting of the head, when a roper pulls a rope around the horns of the head. Springs associated with each pivot urge the head portion back to a neutral, or straight-ahead, position when the rope is not being pulled.

In one embodiment, the rear legs of the simulator can come together when pulled toward one another, and include a spring to bias the legs into a spread position. In this embodiment, if a roper ropes the rear legs of the dummy and applies force to the rear legs, the legs can be pulled together. If the rope slips or adequate force is not applied, the rear legs are be biased by an appropriately positioned spring into a separated position.

In one embodiment, the disclosed roping simulator also includes an electric or battery powered motor that turns to cause the hips of the simulator to "hop," meaning that the hip portion of the simulator rises up and returns back to a normal position, as the simulator is being dragged across the ground. This further simulates the tendency of a live animal to hop, and enables ropers to practice targeting an animal moving in such a way.

These features enable the disclosed roping simulator to behave in a very realistic manner not seen in any currently available roping machine.

In one embodiment, the device disclosed herein includes two primary sub-assemblies: a sled sub-assembly and a body sub-assembly. In this embodiment, the sled assembly is the component that makes contact with the ground. This is also the component of the device that can be attached to a vehicle, such as a four-wheeler or ATV, to enable the device to be pulled behind the vehicle such that it can operate as a roping simulator.

Also in this embodiment, the body sub-assembly component is mounted to the sled sub-assembly, and provides the user interlace for the roping simulator. Specifically, the body sub-assembly provides the user with a target to attempt to rope, and that simulates the size, shape, and movement of an animal (such as a steer) being roped. In one embodiment, the body sub-assembly is removably mounted to the sled sub-assembly. In another embodiment, the body sub-assembly is relatively permanently mounted to the sled sub-assembly, such as by being welded to the sled sub-assembly.

Referring to FIGS. 1 and 2, the sled sub-assembly is labeled as item 102, and the body sub-assembly is labeled as item 104. In these figures, the body of the animal 106 is mounted to the body sub-assembly as will be described in more detail below. Also in these figures, the body includes a cover that obfuscates the view of the underlying components; nonetheless, these components are illustrated in subsequent figures and are discussed in more detail below.

In the illustrated embodiment, the body sub-assembly 104 includes one or more hinges (described in more detail below) that allow the back end of the simulated steer to swing freely in one direction as the sled sub-assembly 102 is pulled into a corner. In this embodiment, centrifugal force causes the back end of the body sub-assembly to swing outward as the device is pulled through a corner.

In the illustrated embodiment, the hinge enables the back end of the body sub-assembly to swing outward to the right up to an approximately 70 degree angle (into the position illustrated in FIG. 2). For example, this outward swinging action occurs when a vehicle pulling the roping simulator device makes a turn to the left. When the vehicle resumes pulling in a straight line or with forward motion, the rear end of the body sub-assembly swings back to a straight line position (the position illustrated in FIG. 1).

Moreover, in the illustrated embodiment, the disclosed device is configured such that the back end of the body sub-assembly can swing in only one direction, meaning that if the device is pulled around a corner in the other direction, the back end will not swing outward. In another embodiment, the device is configured to enable the back end of the body sub-assembly to swing outward in either direction, but will nonetheless return to a center or straight position when the turn is completed and the device is pulled in a straight line or in a forward direction.

Figure 3A:
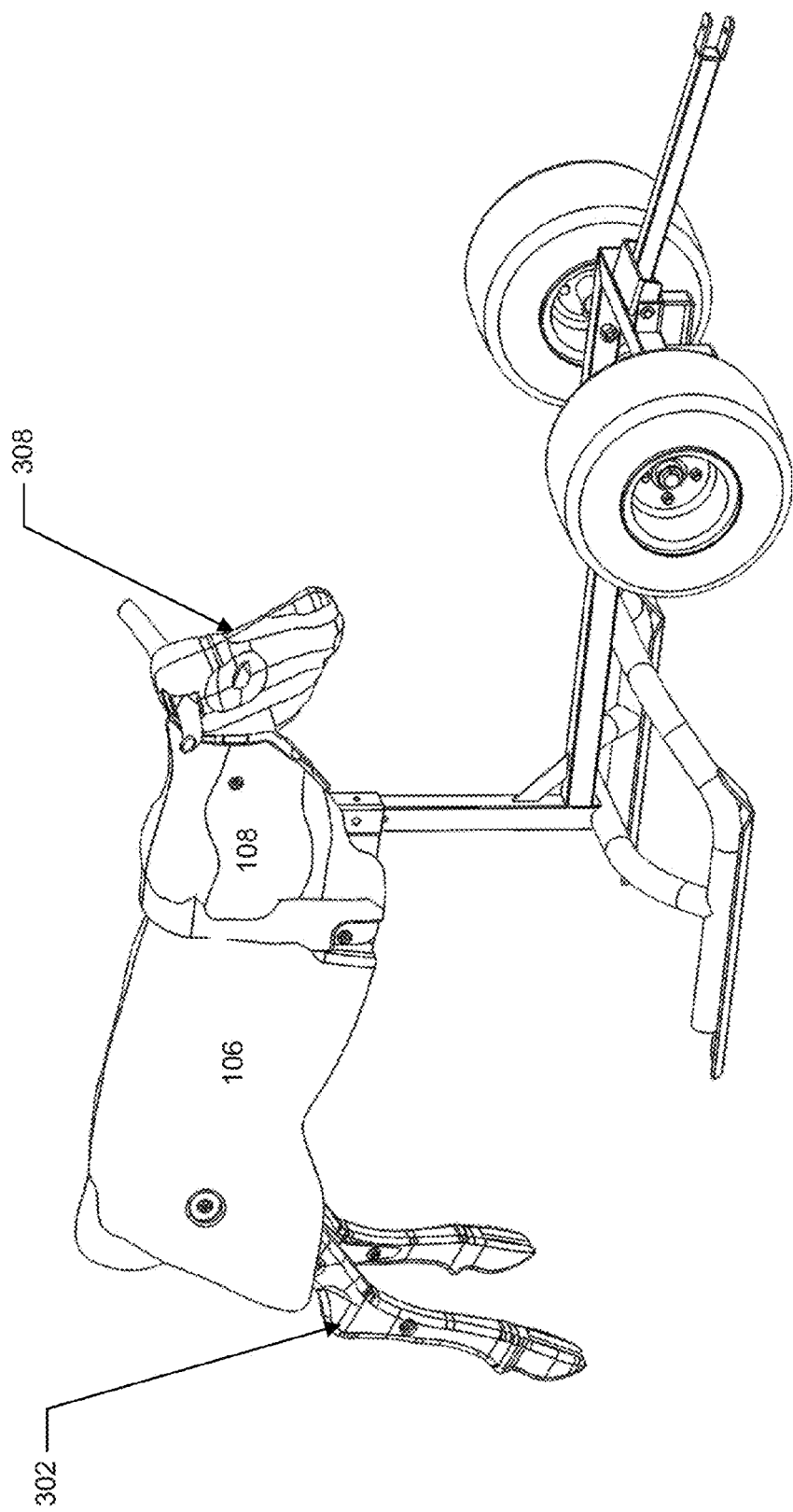

FIG. 3 illustrates a side view of an embodiment of the disclosed roping simulator. FIG. 3*a* illustrates a side view of the embodiment of FIG. 3, with the body portion 106 of the roping simulator mounted to the frame. FIG. 3*a* also illustrates a shoulder portion 108, which is an exterior portion that is designed to simulate the appearance and shape of the shoulders of a roping animal. In FIG. 3, the body portion 106 and the shoulder portion 108 illustrated in FIG. 3*a* are shown in light-colored lines to illustrate the mounting configuration.

In the illustration of FIG. 3, the simulated steer body 106 and the shoulder portion 108 have been removed from the body sub-assembly (i.e., they are illustrated in light-colored lines), revealing the frame 301 that provides for the relative movement discussed herein. Frame 301 includes a frame body portion 301*a* and frame head portion 301*b*. FIG. 3 also shows leg assembly 302, body attachment points 304*a* and 304*b*, and shoulder attachment point 306. Also in the embodiment of FIG. 3, the head 308 of the roping simulator can be seen.

FIG. 3 illustrates a pivot hinge, labeled as 310. In the illustrated embodiment, the pivot hinge 310 enables the frame body portion 301*a* (including the leg assembly 302 and body attachment points 304*a* and 304*b*) to pivot about an axis defined by the hinge. In the illustrated embodiment, the pivoting action is toward the viewer when viewing FIG. 3.

In one embodiment the pivot hinge 310 provides for some limit to the amount of pivoting, such as by providing a stop that prevents the frame body portion 301a from pivoting more than 70 degrees. Also in this embodiment, one or more stops (not shown) prevents frame body portion 301a from pivoting at all in the other direction (i.e., into the page when viewing FIG. 3). In other embodiments, these stops may not prevent movement in the other direction, or may limit movement in the other direction to a similar amount of swing (e.g., 70 degrees) as in the first direction.

Referring still to FIG. 3, return springs 312a and 312b are illustrated. In this embodiment, spring 312a connects between the body 106 and the frame of the roping simulator and as a result, applies a force to bias the frame body portion 301a into a straight position, such as the position illustrated in FIG. 1. In this way, when the frame body portion 301a pivots into the position illustrated in FIG. 2, return spring 312a urges the body portion 301a back to a straight position by pulling on the body 106 (which is connected to connection points 304a and 304b). Return spring 312a works in conjunction with another spring, not illustrated in FIG. 3, to provide this biasing. By using such springs, the disclosed simulator accurately simulates the movement of a steer's body during a "washout," in that the body of a live animal pivots outward as the animal turns the corner and returns to a straight position as the animal resumes its forward motion.

Return spring 312b provides a similar biasing functionality with regard to the head portion 301b, as discussed in more detail below. Specifically, return spring 312b biases the head portion 301b (including the dummy head 308 and the shoulder portion 108) into a straight position in the event the head portion 301b (including shoulder portion 108) pivots into the page as viewed in FIG. 3.

Figure 3B:
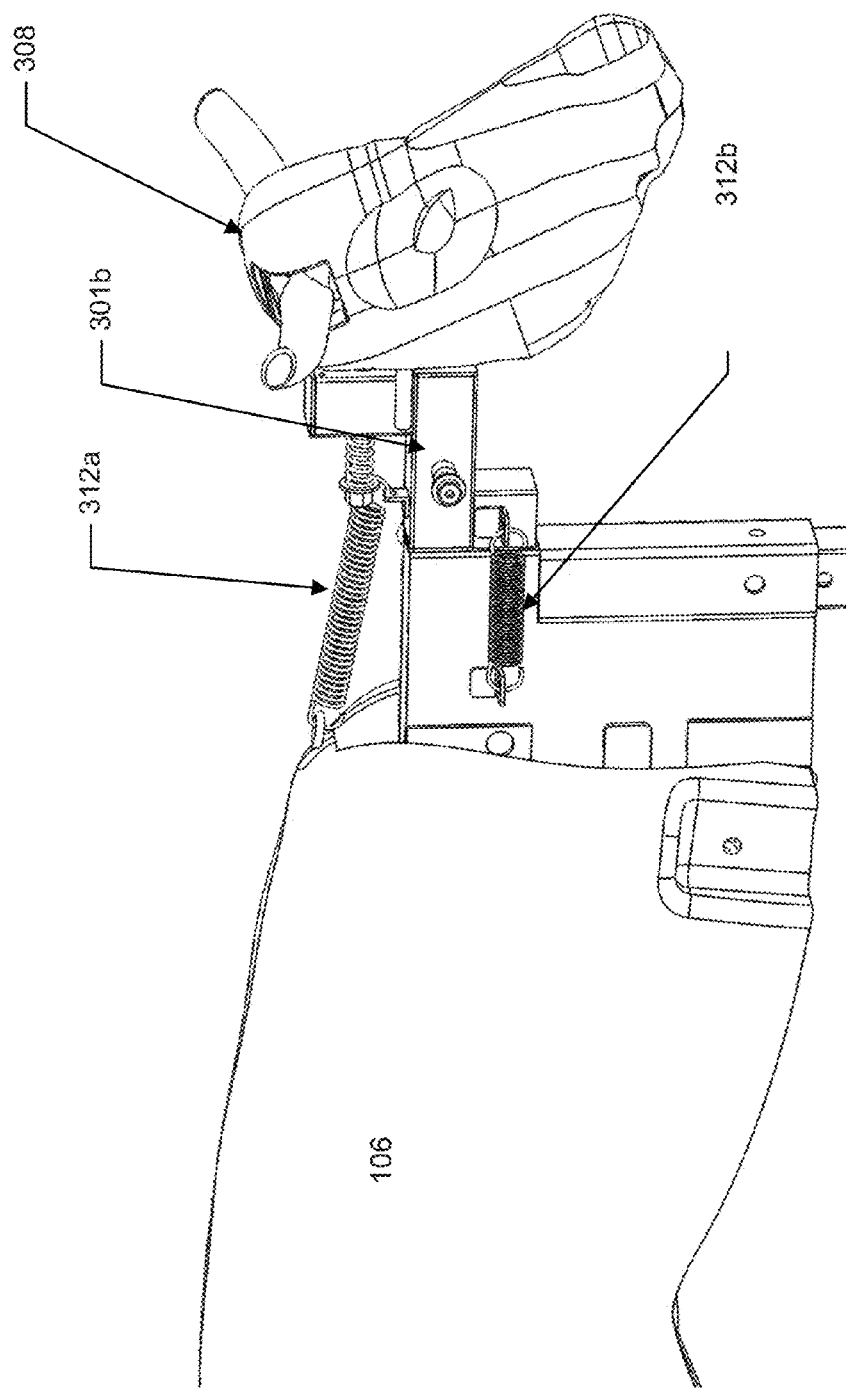

FIG. 3b illustrates a close-up view of the return springs 312a and 312b, with the shoulder portion 108 of FIG. 3a removed for clarity. FIG. 3b illustrates a close-up view of the manner in which the return spring 312a is connected to the body 106 of the roping simulator, and of the manner in which the return spring 312b is connected to the head portion 308. In the illustration of FIG. 3b, the shoulder portion 108, which was illustrated in FIG. 3a, has been removed for clarity. Accordingly, it can be seen that return spring 312a applies a biasing force to bias the body portion 301a into a straight position and return spring 312b applies a biasing force to bias the head portion 308 into a straight position when those portions are biased into their respective pivoted positions.

Figure 11:
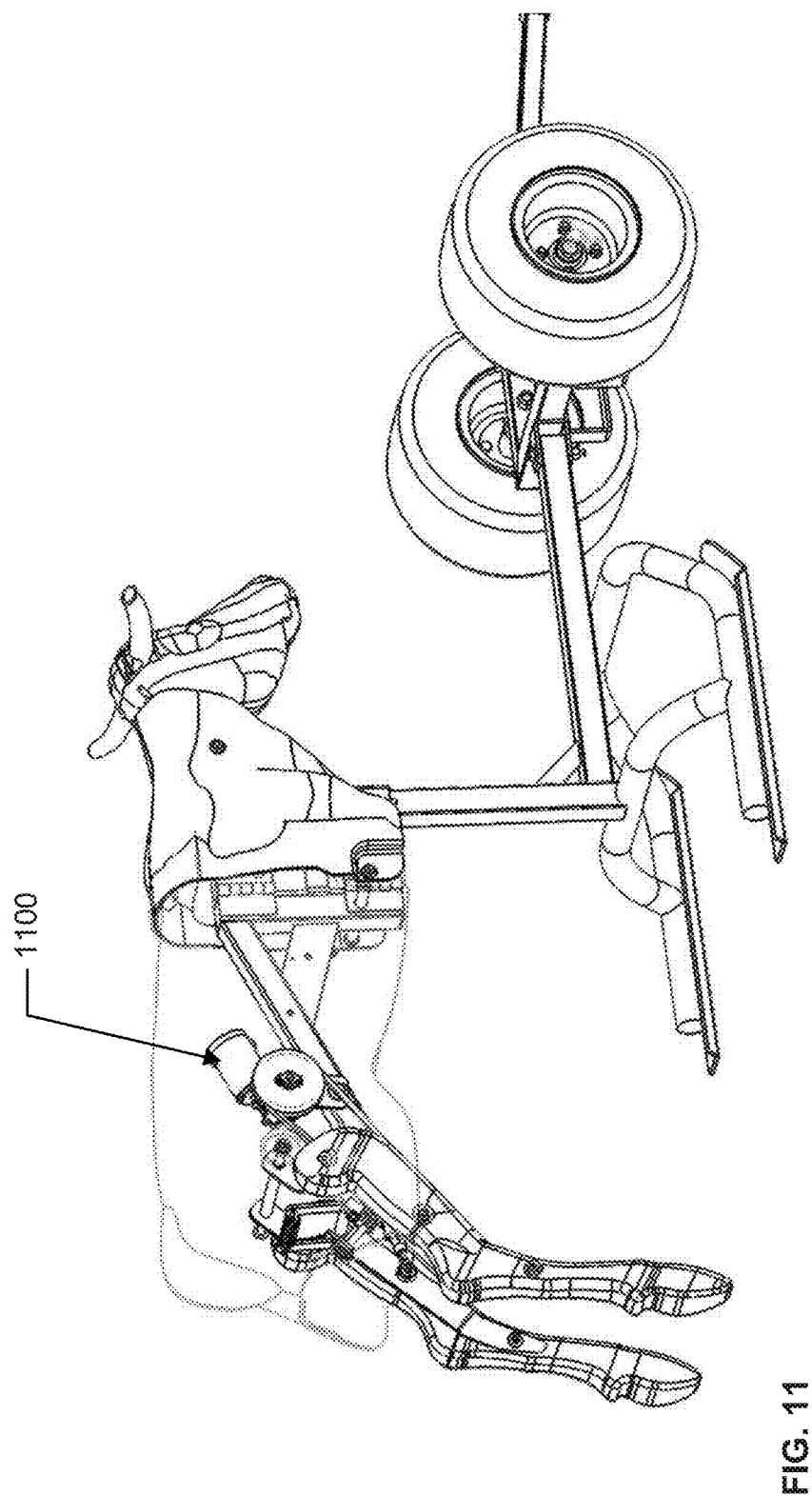
FIG. 11 illustrates an embodiment of the disclosed roping simulator in which a motor is provided to cause the hips of the simulator to "hop."

In one embodiment, the return spring 312a is also responsible for providing a "hopping" motion in the hips of the roping dummy. In this embodiment, the fact that the steer body 106 is attached to the frame body portion 301a and to the return spring 312a means that the steer body 106 (which includes the "hips" of the roping simulator) can hop while being pulled by an appropriate vehicle. In this embodiment, the return spring 312a runs down the backbone of the roping simulator and brings the hips upward as needed to "hop." In this way, the steer body 106 of the simulator can hop while the sled sub-assembly 102 remains flat on the ground as it is dragged. FIG. 11 illustrates an exemplary embodiment wherein a motor 1100 causes the rear portion of the body 106 to hop upward; in this embodiment, the return spring 312a is responsible, in part, for biasing the body portion 106 downward to simulate the downward motion seen during a hop.

Figure 4:
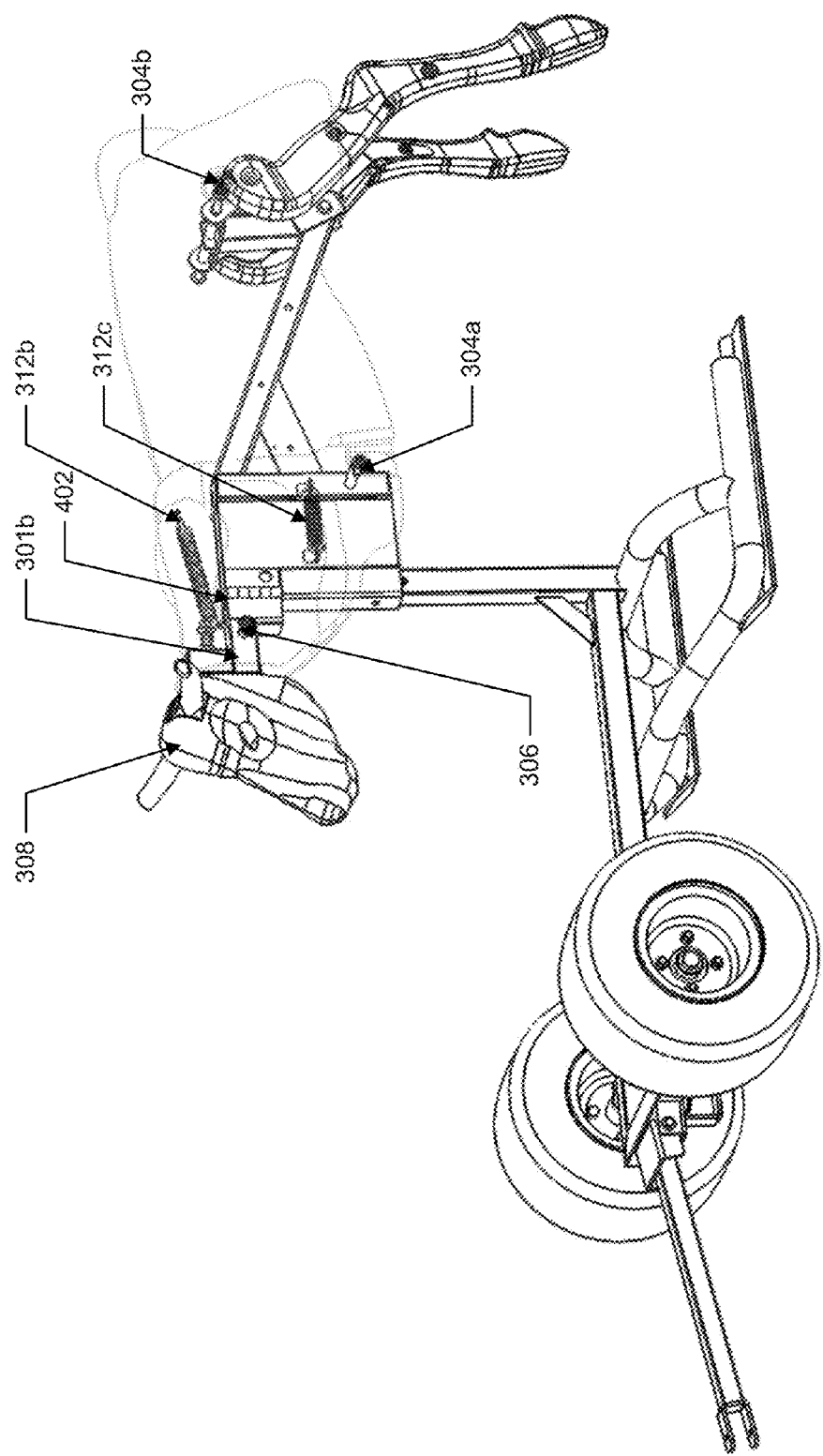
FIG. 4 illustrates another view of an embodiment of the internal frame of the disclosed roping simulator.

FIG. 4 illustrates an example of the disclosed roping simulator when viewed from the other side as the view illustrated in FIG. 3. FIG. 4 further illustrates the "shoulder/forward pivot hinge" 402. In the illustrated embodiment, this pivot hinge 402 enables the head portion 301b (containing the head 308 and the shoulder portion 108) to pivot similarly to the pivoting described above with regard to body portion 301a. However, in a preferred embodiment, this pivoting does not occur while the simulator is pulled around a corner.

Instead, in the preferred embodiment, because the head portion 301b and the shoulder portion 108 are forward facing in a straight line while the simulator is being dragged, the head portion 301b (along with the shoulders 108) only pivots when the user pulls on it (e.g., after a rope loop has been landed around the head portion 301b). In this situation, when the user pulls on the head portion 301b (either with a rope or by hand), the return spring 312b (illustrated in FIG. 3) biases the head portion into a straight position, thus returning the head and shoulder portion to the straight position after the user's rope conies free. The disclosed apparatus therefore simulates the tendency, in a live steer, for the animal to straighten its neck and shoulders (or resist bending its neck and shoulders) during or after being roped.

FIG. 4 also illustrates return spring 312c, which is the primary return spring for returning the body portion 301a to a straight position when it has been pivoted. Return spring 312c thus works in conjunction with return spring 312b to provide for the "washout" simulation feature of the apparatus disclosed herein.

Finally, FIG. 4 illustrates the mounting points 304a and 304b for mounting the steer body 106 to the frame. It also illustrates the mounting point 306 for mounting the shoulder portion 108 to the frame.

Figure 5:
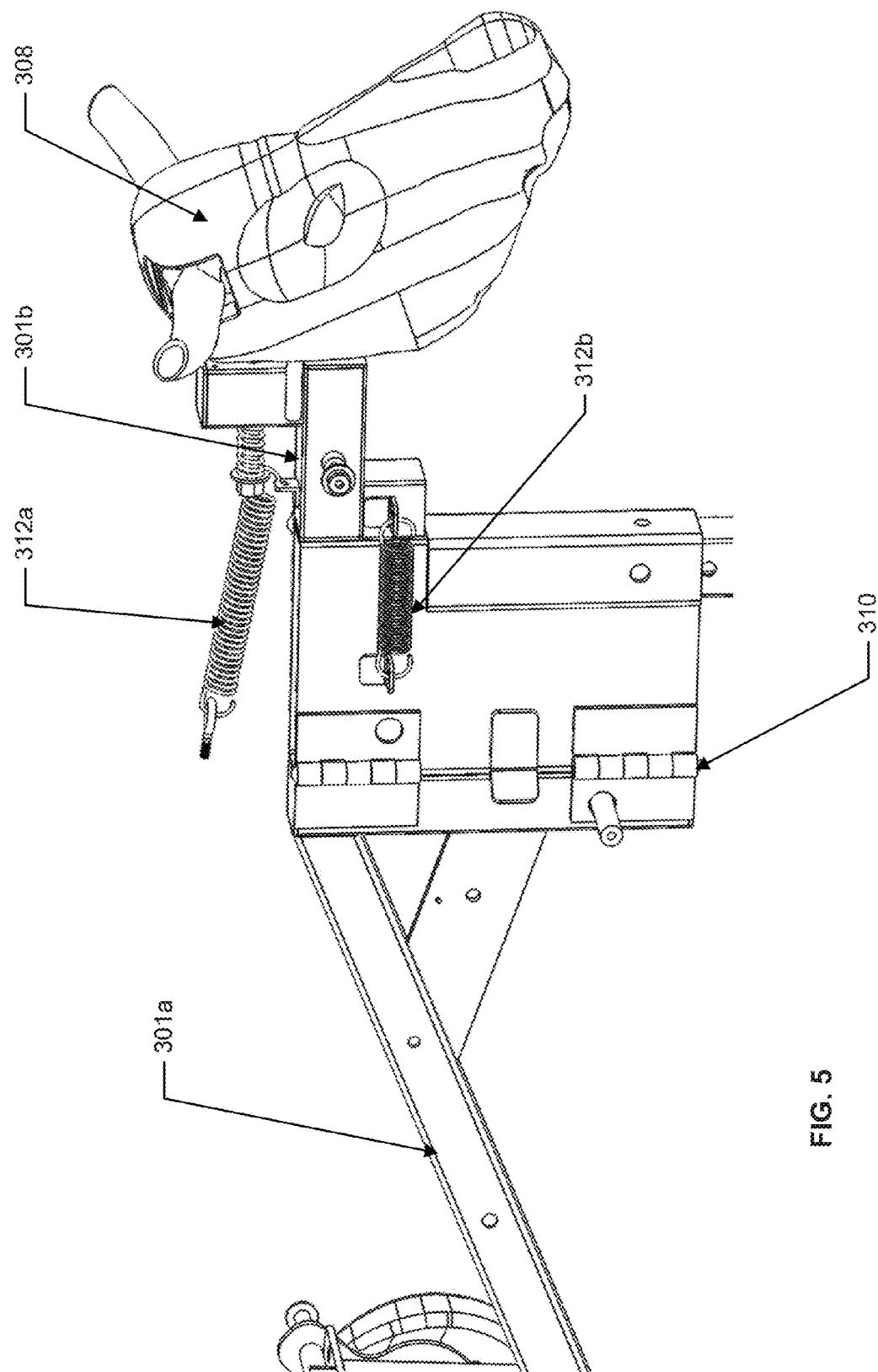
FIG. 5 Illustrates a view of an embodiment of the disclosed roping simulator that indicates additional detail of a pivot hinge that facilitates the disclosed washing motion.

FIG. 5 illustrates a more detailed view of pivot hinge 310 and return springs 312a and 312b previously discussed with regard to FIG. 3. As can be more clearly seen in FIG. 5, return spring 312a biases the body portion 301a into a straight position by connecting to the steer body 106 (not shown). As can be further seen in FIG. 5, return spring 312b biases the head portion 301b (including the shoulder portion 108) into a straight position.

Figure 7:
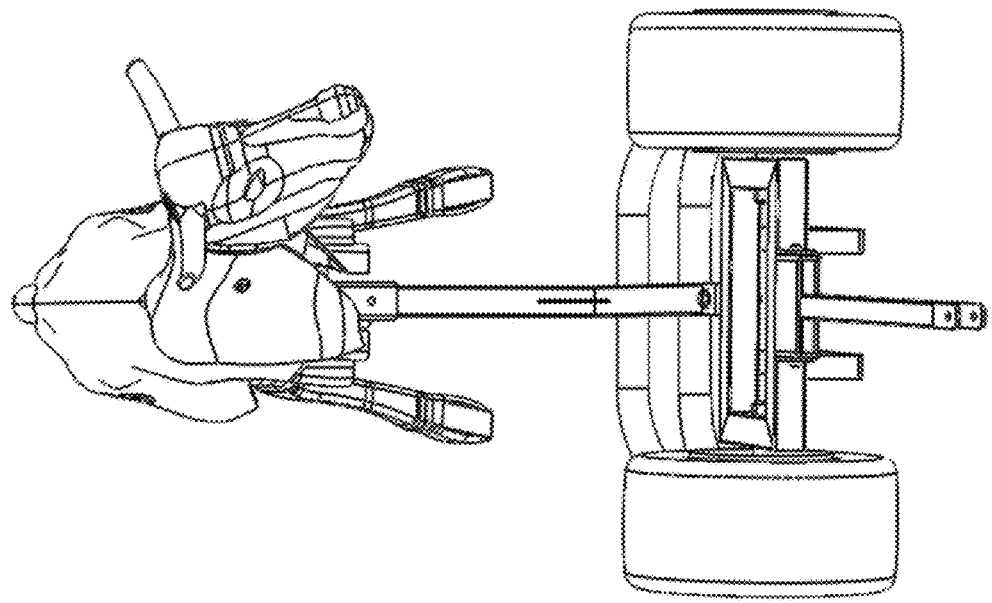
FIG. 7 Illustrates an embodiment of the disclosed roping simulator with the head portion in a bent, or pivoted, position.
Figure 6:
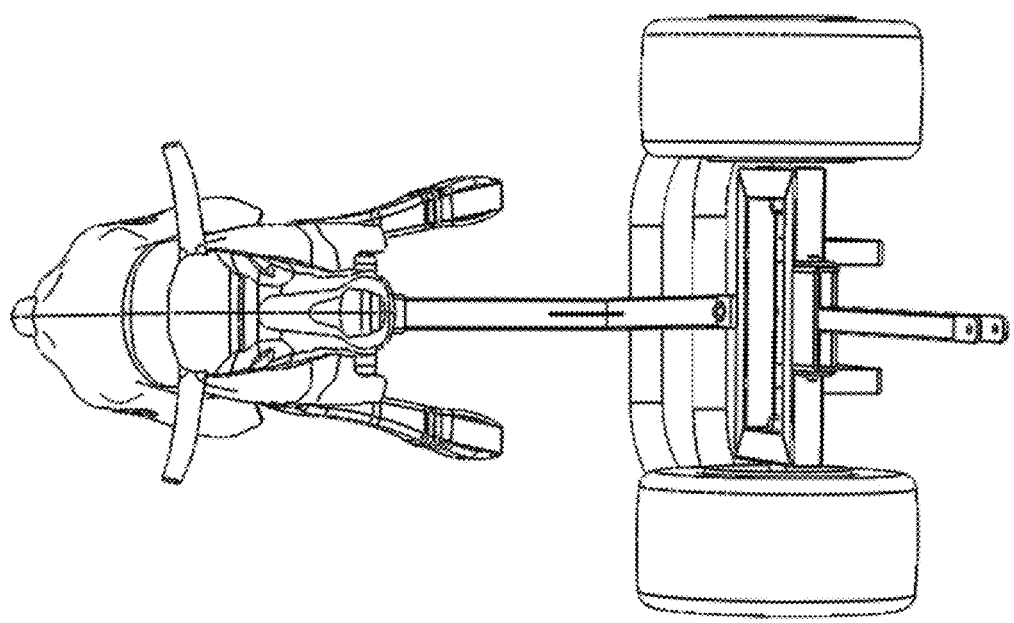
FIG. 6 illustrates an embodiment of the disclosed roping simulator with the head portion in a neutral, or straight, position.

FIGS. 6 and 7 illustrate the positions of the head and shoulders of the disclosed roping simulator in a straight (FIG. 6) and pivoted (FIG. 7) position. As can be seen, in the illustrated embodiment, the head and shoulder portions of the simulator are configured to pivot together in a different (i.e., opposite) direction than the body portion (illustrated in FIGS. 1 and 2). In other embodiments, the head portion and the body portion pivot in the same direction, or one or both portions can be configured to pivot in either direction.

Figure 8:
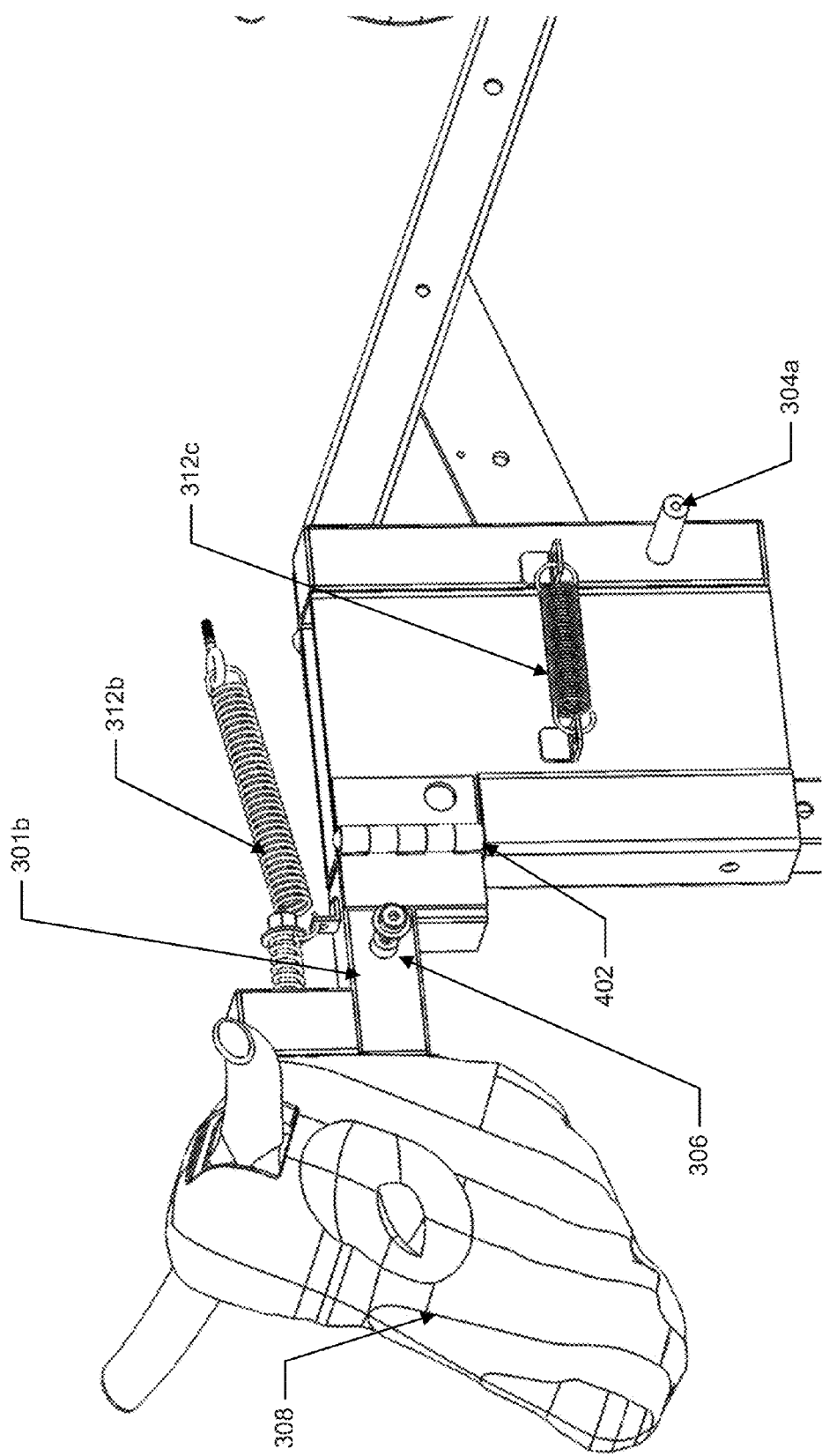
FIG. 8 illustrates an embodiment of the disclosed roping simulator in which the pivot mechanisms for the head and body portions are more clearly visible.

FIG. 8 illustrates an enlarged view of the shoulder pivot hinge 402, illustrating that in this embodiment, the shoulder pivot hinge enables the head portion and the shoulder portion to pivot outward from the page and to be biased in a straight position by the return spring 312b (not shown). FIG. 8 also further illustrates an example of return spring 312a, which is position to bias the body portion of the disclosed roping simulator into a straight position when the body portion pivots. In the illustrated embodiment, the body portion pivots into the page as illustrated in FIG. 8.

Figure 9:
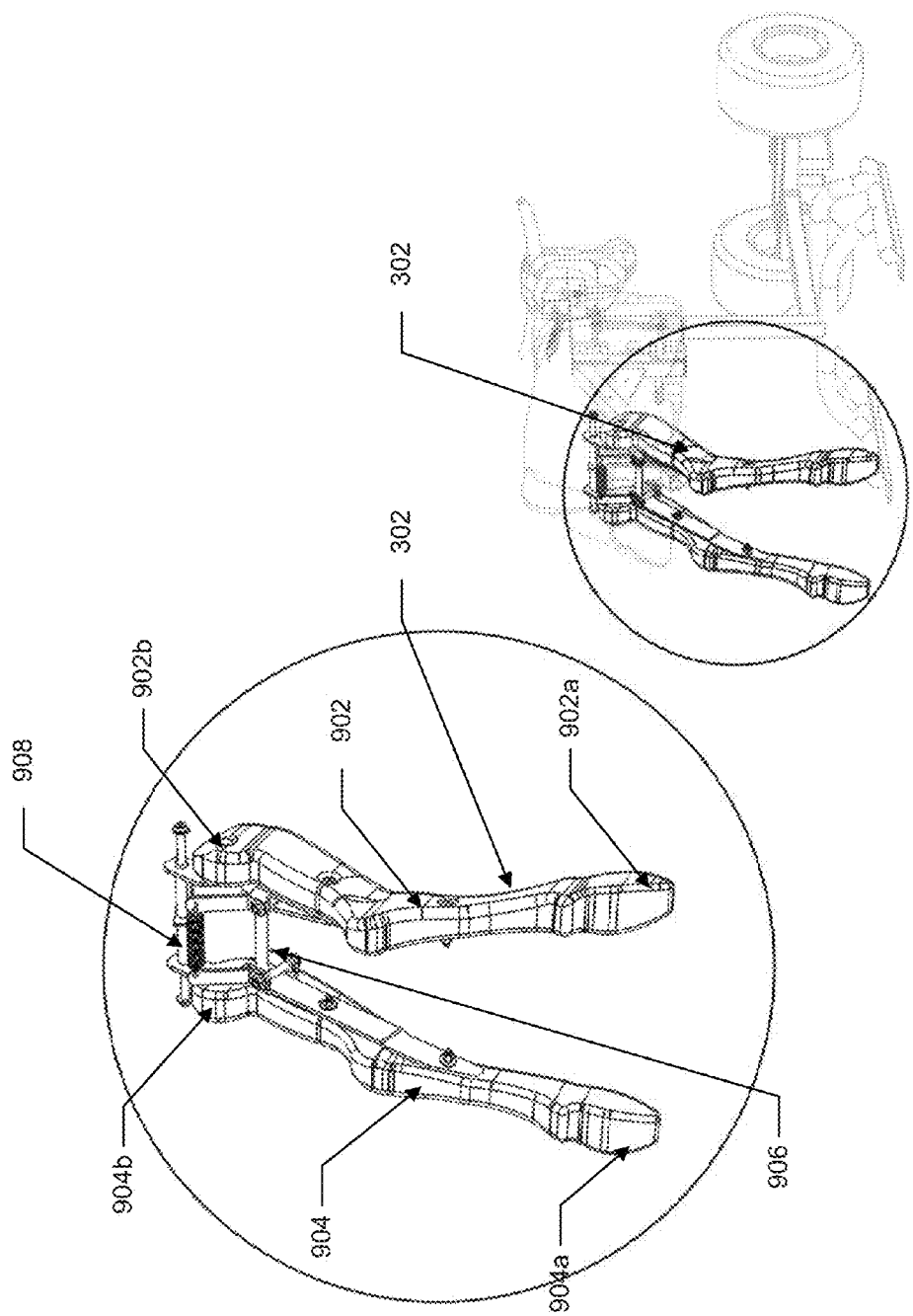
FIG. 9 illustrates an embodiment of the disclosed roping simulator with a leg assembly whose legs are biased apart, wherein the legs are illustrated in an open position.
Figure 10:
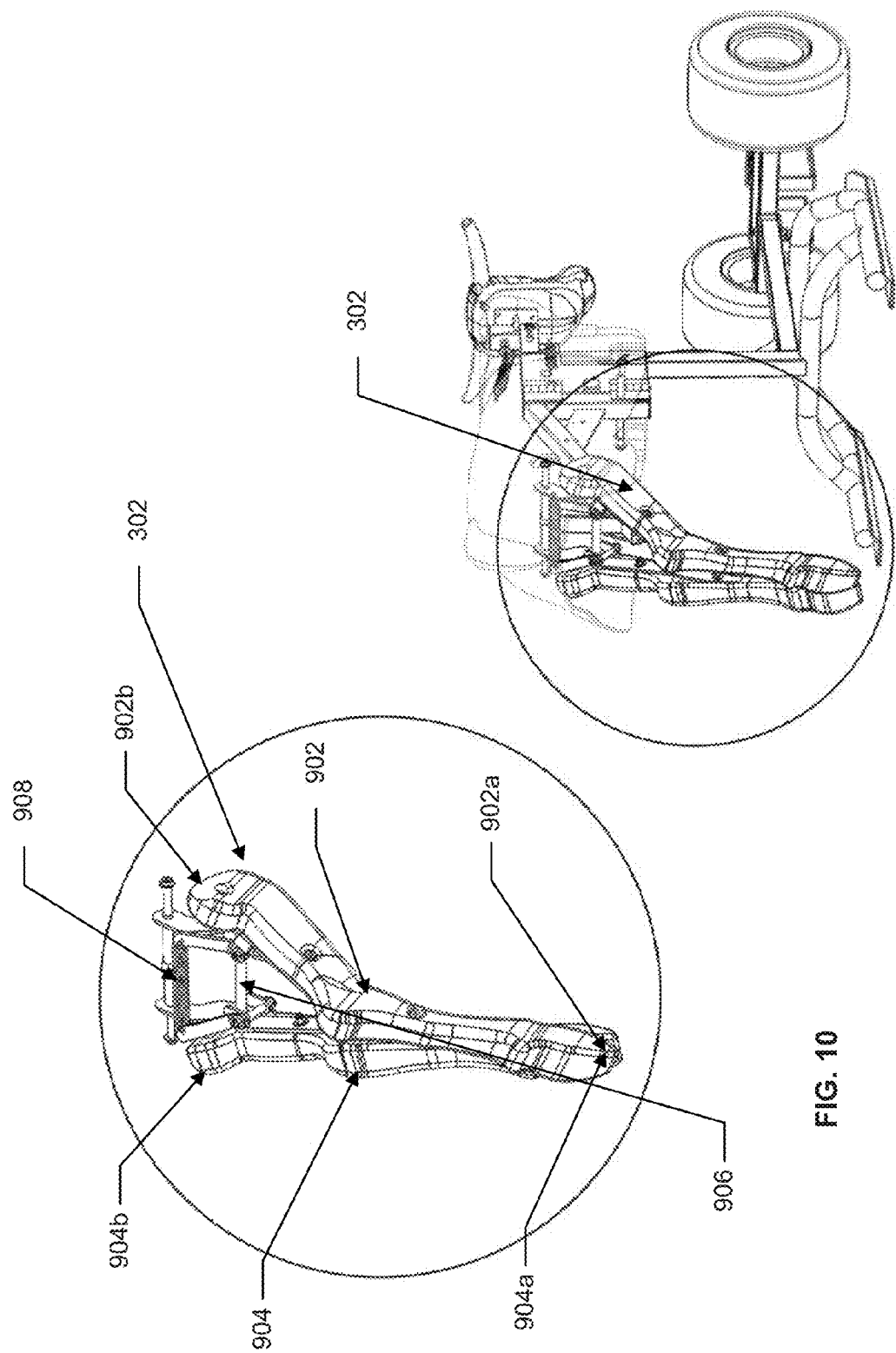
FIG. 10 illustrates an embodiment of the disclosed roping simulator with a leg assembly whose legs are biased apart, wherein the legs are illustrated in a closed position.

FIGS. 9 and 10 illustrate an enlarged view of the leg assembly 302 of one embodiment of the disclosed roping simulator. Specifically, in FIG. 9, the legs of the leg assembly 302 of the roping simulator are spread apart, and in FIG. 10, the legs of the leg assembly 302 of the roping simulator have been pulled together, such as by a rope or roper's arms. As can be seen in FIGS. 9 and 10, the leg assembly 302 includes a right leg 902 and a left leg 904 each mounted to a pivot bar 906. In the illustrated embodiment, leg 902 and leg 904 can each pivot at the end of the pivot bar, such that pulling the feet portions 902a and 904a together causes the top portions 902b and 904b to separate. Further, spring 908 is provided to bias the top portions 902b and 904a toward one another, thus biasing the bottom portions 902a and 904a away from each other. In this way, spring 908 is provided to urge legs 902 and 904 apart and to resist attempts by a roper to push the legs together. This advantageously simulates the natural effect of a rope on the hind legs of a live animal.

Figure 12:
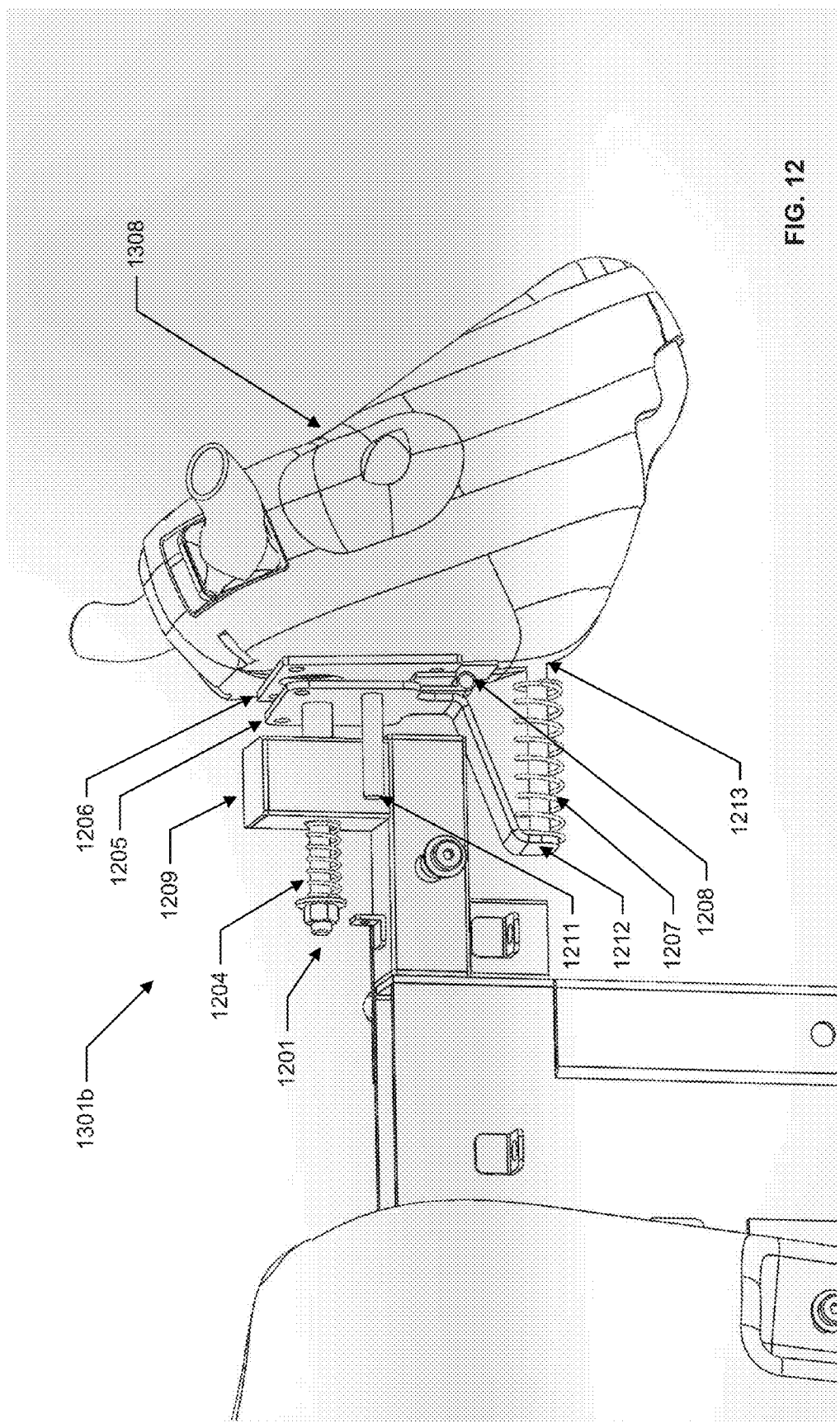
FIG. 12 illustrates an embodiment of the disclosed roping simulator in which the head portion is pivotable both downward and rotationally.

FIG. 12 illustrates the head portion of one embodiment of the disclosed roping simulator. Specifically, in FIG. 12, the head portion 1301b includes a head 1308 around which ropers using the device attempt to throw a rope. In FIG. 12, pivoting of the head portion about the neck and shoulders in two directions (i.e., downward and rotationally) is enabled by various components of the head portion 1301b that connect the head 1308 to the remainder of the roping simulator. These components are discussed in more detail below.

The embodiment of FIG. 12 includes main pivot bolt 1201 which engages head post 1209 to affix primary head pivot plate 1205 to the head portion 1301b of the disclosed roping simulator. Main pivot spring 1204 is positioned between main pivot bolt 1201 and head post 1209 to urge the head 1308 back to center when a roper pulls the head in a rotationally pivoted direction. In this embodiment, the main pivot spring 1204 urges the head by imparting rotational forces on the head portion 1308, such that the head portion 1308 tends to return from a rotated position about the axis of the main pivot bolt 1201 to a neutral position along that axis. The FIG. 12 embodiment also illustrates primary pivot stop 1211, which contacts head post 1209 when the head 1308 is rotated about the axis of the main pivot bolt 1201. Primary pivot stop 1211 prevents the head portion 1308 from rotating more than a predetermined amount about the pivot bolt 1201. This movement will be discussed in more detail below.

As is illustrated in FIG. 12, primary head pivot plate 1205 includes a flange 1212 extending rearward from the plate 1205. The FIG. 12 embodiment also includes a secondary head pivot plate 1206 which is connected to primary head pivot plate 1205 by way of head pivot hinge 1208. A secondary pivot spring 1207 encircles secondary pivot spring shaft 1213 and engages the flange 1212 at one end and the head 1308 of the roping simulator at the other end. The secondary pivot spring 1207 is a compression spring, such that when the head 1308 is pivoted about secondary pivot hinge 1208 in a downward direction by a pull on a roper's rope, the secondary pivot spring 1207 is compressed and urges the head 1308 upward about the secondary pivot hinge 1208 to a neutral or straight-ahead position. This movement is also addressed in more detail below.

Figure 13:
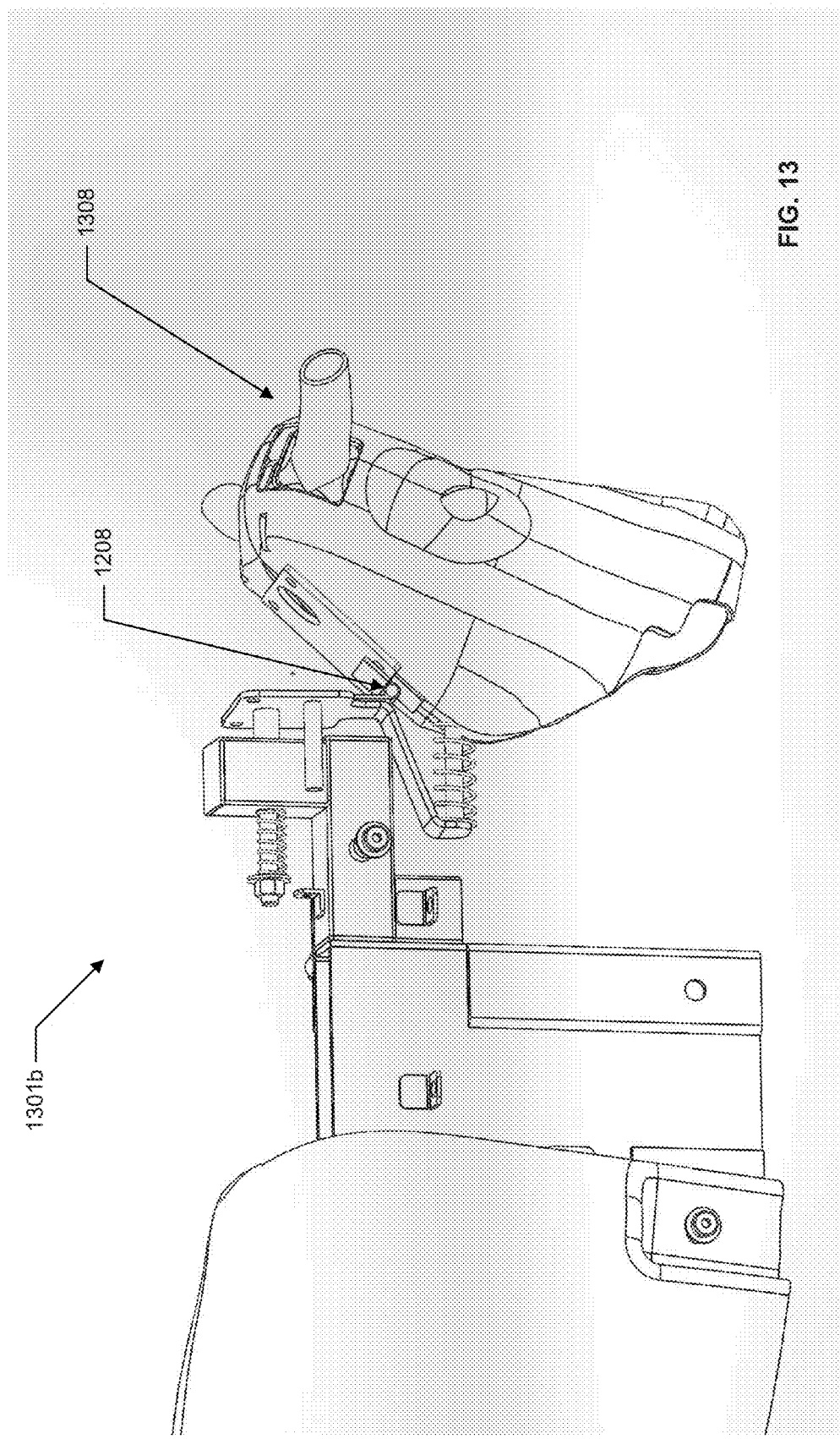
FIG. 13 illustrates an embodiment of the disclosed roping simulator in which the head portion is pivotable both downward and rotationally, positioned in a downward-pivoted position.

Referring to FIG. 13, the embodiment of FIG. 12 is illustrated with the head 1308 of the head portion 1301b pivoted in a downward direction about secondary pivot hinge 1208, such as when pulled by a rope engaged with the head portion of the disclosed apparatus. As can be seen, the secondary pivot spring 1207 in the FIG. 13 embodiment has been compressed from its position in FIG. 12, and is therefore urging the head 1308 upward about secondary pivot hinge 1208.

Figure 14:
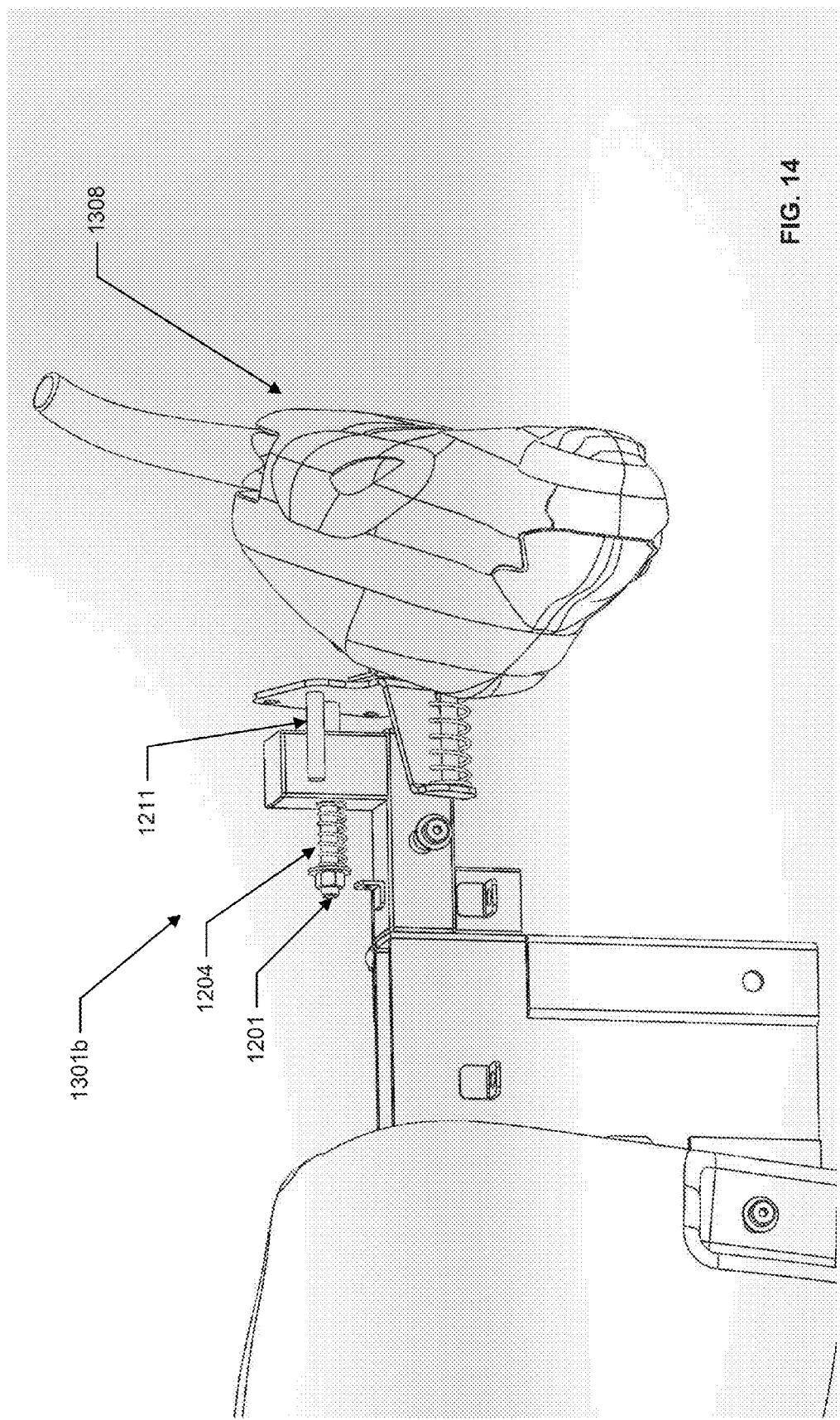
FIG. 14 illustrates an embodiment of the disclosed roping simulator in which the head portion is pivotable both downward and rotationally, positioned in a downward-pivoted and rotationally-pivoted position.

Referring to FIG. 14, the embodiment of FIG. 12 is illustrated with the pivoting motion about secondary pivot hinge 1208 illustrated in FIG. 13 with an additional rotational pivot about the main pivot bolt 1201, such as when pulled by a rope engaged with the head portion of the disclosed apparatus. In the embodiment of FIG. 14, the head 1308 is pivoted about pivot bolt 1201 until the primary pivot stop 1211 touches the head post 1209, preventing further rotation of the head 1308. In this embodiment, when the head 1308 is in the position illustrated of FIG. 14, a roper's rope is pulling the head 1308 into the rotated position with the primary pivot stop 1211 touching the head post 1209, and the main pivot spring 1204 is urging the head portion to rotate the primary pivot stop 1211 away from the head post 1209. Moreover, in the FIG. 14 embodiment (as in the FIG. 13 embodiment), the secondary pivot spring 1207 is urging the head portion 1308 to rotate about the secondary pivot spring (not visible in FIG. 14) into an upward position. This position simulates the motion of the head, neck, and shoulders of a live animal when a rope is engaged with the head or neck of the live animal.

Figure 15:
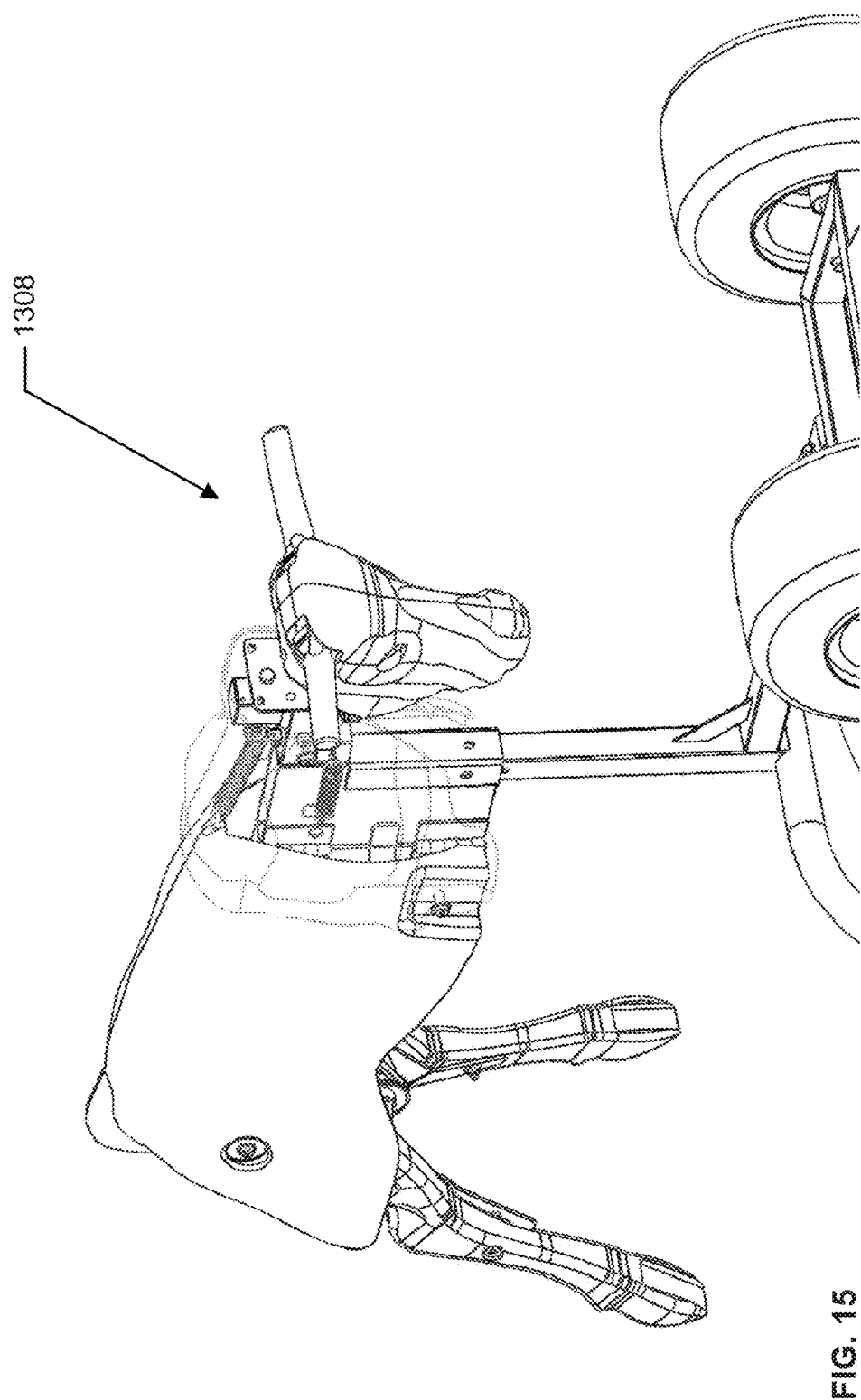
FIG. 15 illustrates the head portion of the disclosed roping simulator in the downward-pivoted position of FIG. 13 in the context of the entire simulator.
Figure 16:
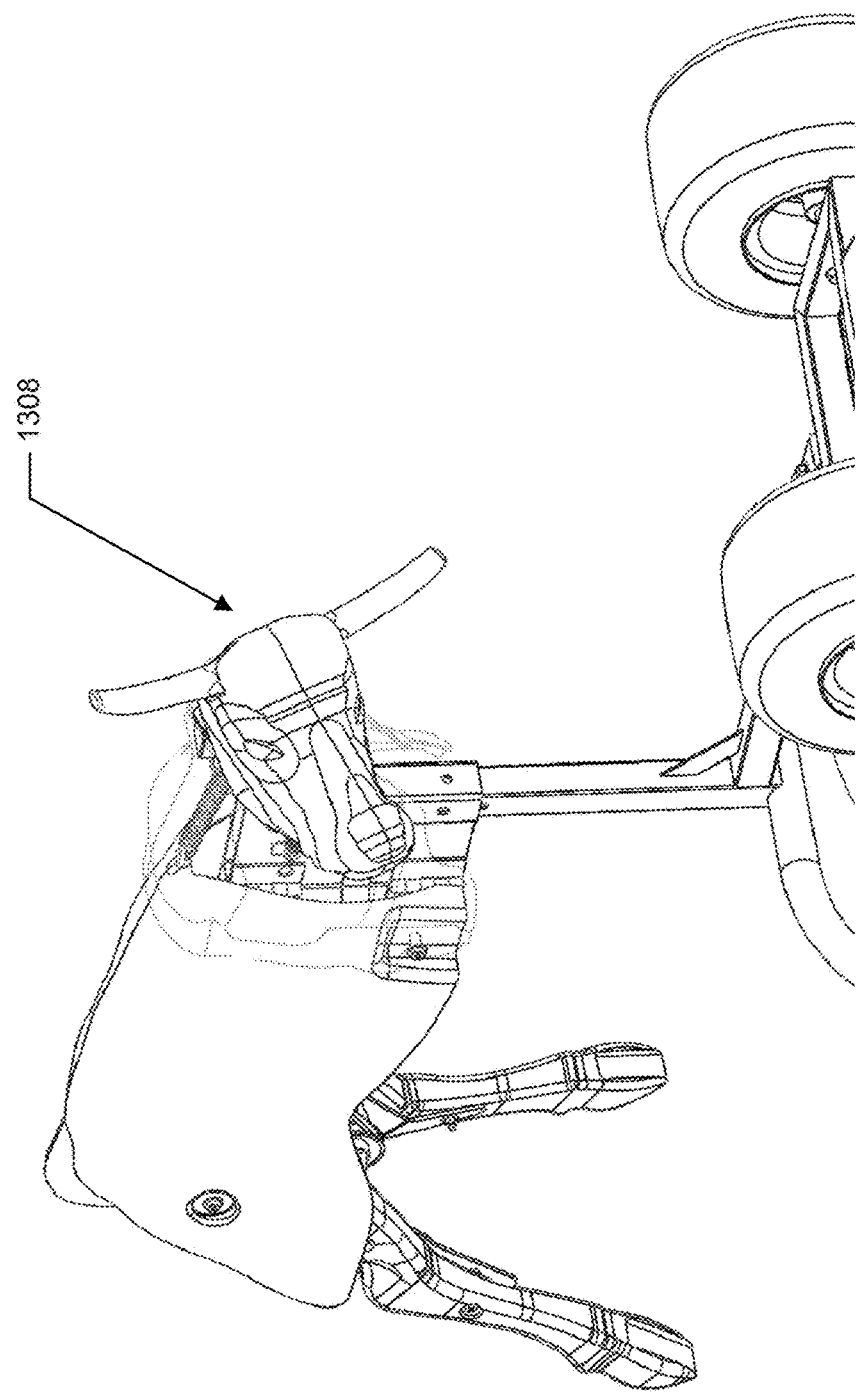
FIG. 16 illustrates the head portion of the disclosed roping simulator in the downward-pivoted and rotationally-pivoted position of FIG. 14 in the context of the entire simulator.
Figure 17:
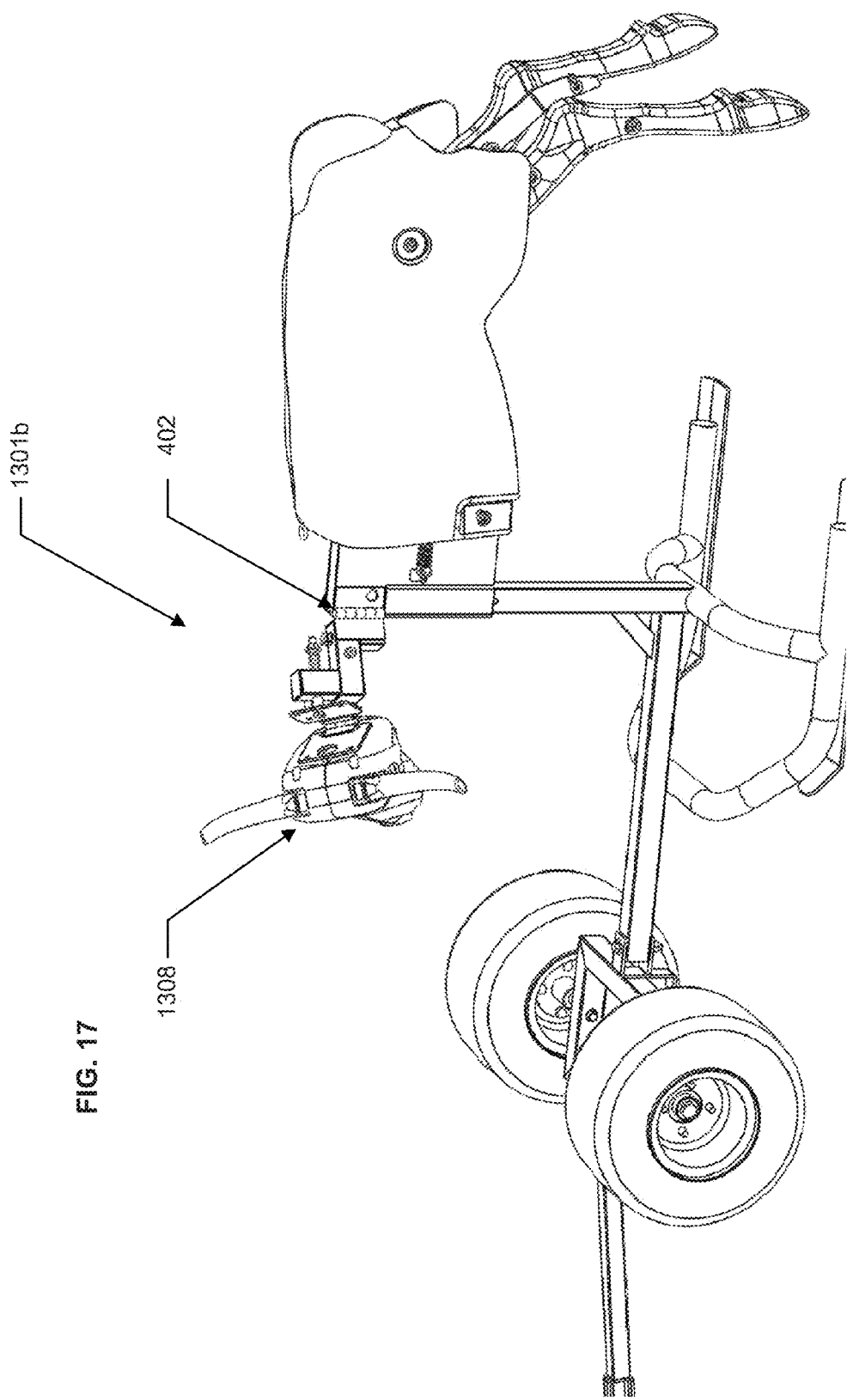
FIG. 17 illustrates the head portion of the disclosed roping simulator in the downward-pivoted and rotationally-pivoted position of FIG. 14, wherein the head and shoulders portion of the simulator is additionally pivoted about a head and shoulders pivot hinge, in the context of the entire simulator.

FIG. 15 illustrates the head 1308 rotated downward about pivot hinge 1208 (not shown) to the position of FIG. 13 in the context of the entire roping simulator. FIG. 16 similarly illustrates the head 1308 rotated downward about pivot hinge 1208 (not shown) and rotated about main pivot bolt 1201 (not shown) to the position of FIG. 14 in the context of the entire roping simulator. FIG. 17 illustrates the rotation of FIG. 16, shown from the other side of the roping simulator, and shown with the head portion 1301b pivoting about a shoulder/forward pivot hinge 402 such as that illustrated in FIGS. 4 and 8 and discussed in more detail above.

Figure 18:
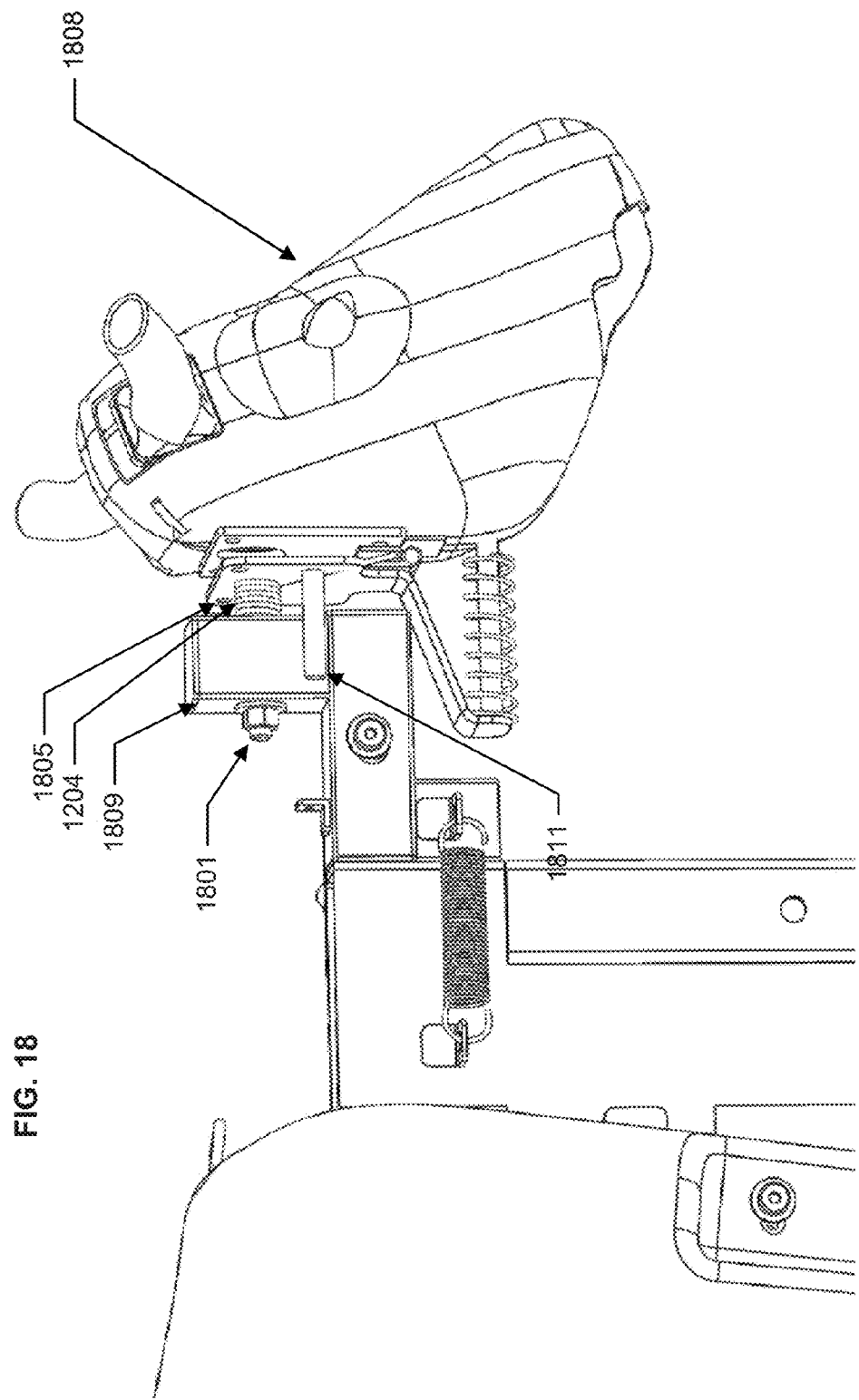
FIG. 18 illustrates an alternative embodiment of the disclosed roping simulator in which the head portion is pivotable both downward and rotationally.
Figure 19:
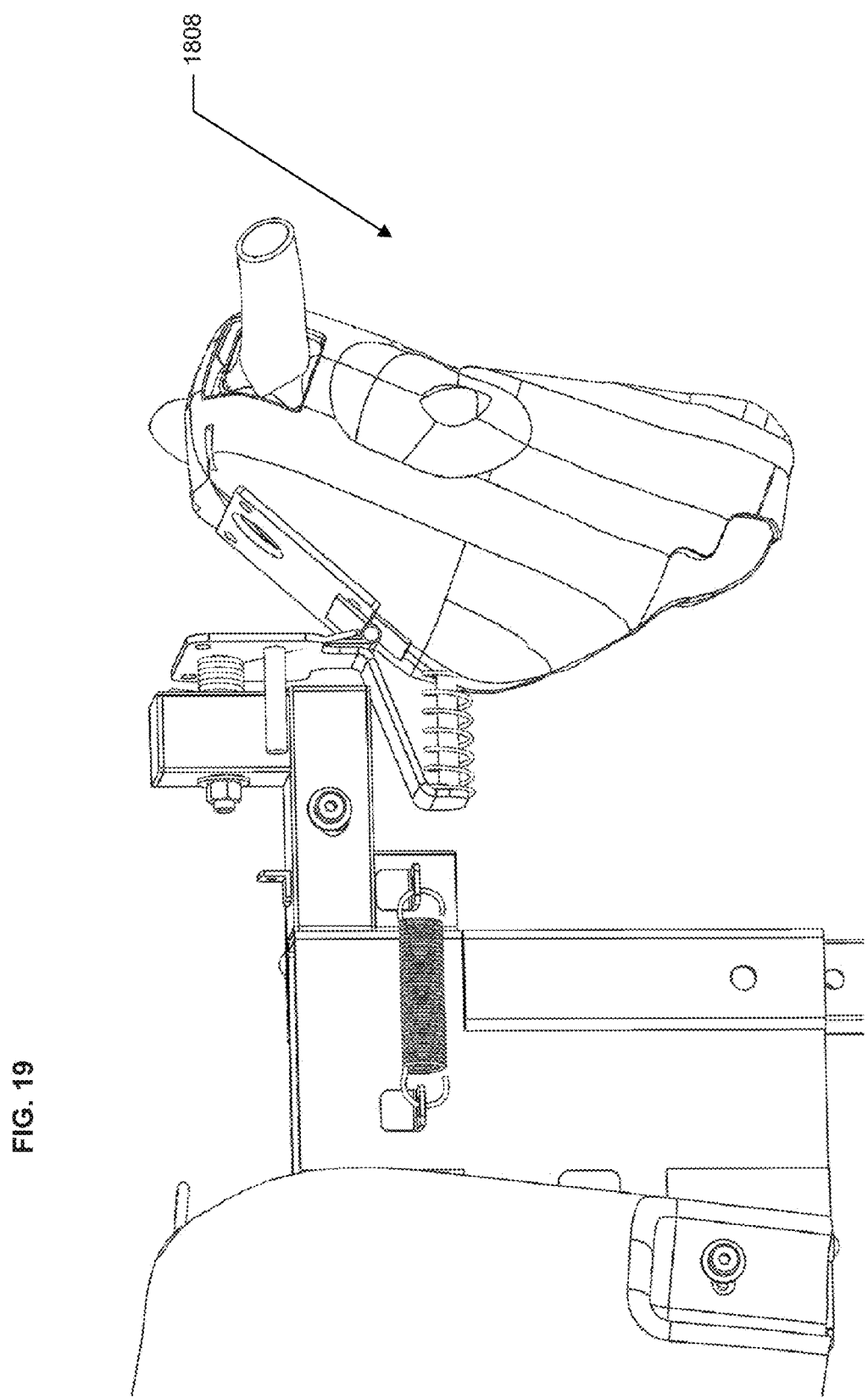
FIG. 19 illustrates an alternative embodiment of the disclosed roping simulator in which the head portion is pivotable both downward and rotationally, as shown in FIG. 18, positioned in a downward-pivoted position.
Figure 20:
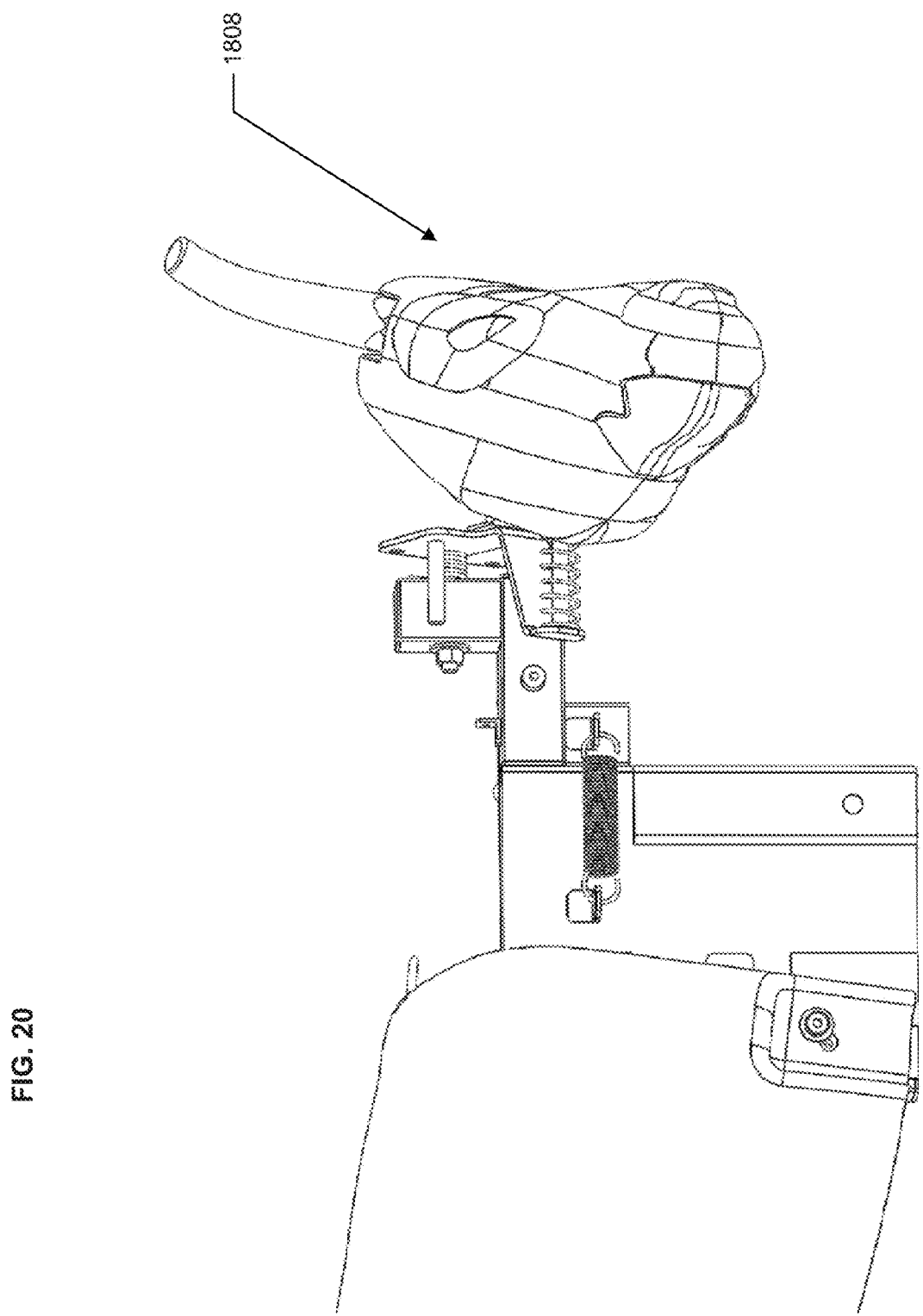
FIG. 20 illustrates an alternative embodiment of the disclosed roping simulator in which the head portion is pivotable both downward and rotationally, as shown in FIG. 18, positioned in a downward-pivoted and rotationally-pivoted position.

FIGS. 18-20 illustrate the head portion of an alternative embodiment of the disclosed roping simulator in which the head portion is pivotable both downward and rotationally at different points in the pivoting action of the head portion. Specifically, FIGS. 18-20 illustrate the head portion 1808 of an alternative embodiment in which the position of one of the springs to return the head to a neutral position is moved to a different location from its position as illustrated in FIGS. 12-14.

Referring to FIG. 18, the illustrated embodiment includes a main pivot bolt 1801 which engages head post 1809 to affix primary head pivot plate 1805 to the head portion of the disclosed roping simulator. Main pivot spring 1804 is positioned between the head post 1809 and the head pivot plate 1805 to urge the head 1808 back to center when a roper pulls the head in a rotationally pivoted direction. In this embodiment, the main pivot spring 1804 urges the head by imparting rotational forces on the head portion 1808, such that the head portion 1808 tends to return from a rotated position about the axis of the main pivot bolt 1801 to a neutral position along that axis. The FIG. 18 embodiment also illustrates primary pivot stop 1811, which contacts head post 1809 when the head 1808 is rotated about the axis of the main pivot bolt 1801. Primary pivot stop 1811 prevents the head portion 1801 from rotating more than a predetermined amount. Accordingly, it should be appreciated that FIG. 18 illustrates an alternative embodiment from that shown in FIG. 12, in that the main pivot bolt 1801 of FIG. 18 is shorter than the main pivot bolt 1201 of FIG. 12 because of the positioning of the main pivot spring 1804 between the head post 1809 and the head pivot plate 1805 in FIG. 18.

The remaining components of FIG. 18, related to the downward (as opposed to rotational) pivoting of the head portion 1808 operate similarly to the embodiment discussed above with regard to FIG. 12. Accordingly, in FIG. 18, like in FIG. 12, when the head 1808 is pivoted in a downward direction by a pull on a roper's rope, a secondary pivot spring is compressed and urges the head 1808 upward to a neutral or straight-ahead position. FIG. 19 illustrates the head portion 1808 in a downward position, and FIG. 20 illustrates the head portion 1808 in a downward and rotated position. The positions illustrated in FIGS. 19 and 20 are achieved by a roper pulling a rope engaged with the head portion 1808 of the disclosed roping simulator.

Accordingly, in the embodiments illustrated in FIGS. 12-20, a roper's rope (not shown) is pulling the head into the illustrated position of FIG. 14 or 20, and the springs 1204 and 1207 are urging the head 1308 into the position illustrated in FIG. 12 or 18. Thus, when the roper's rope is released, springs 1204 and 1207 cause the head 1308 to pivot about the main pivot bolt 1201 and about secondary pivot hinge 1208 to return to the position of FIG. 12 or 18. This simulates the motion of the head, neck, and shoulders of a live animal when a rope is engaged with the head or neck of the animal and pulled by a roper.

In some embodiments, the disclosed roping simulator provides for one or more additional features that further enhance the realism provided by the device. For example, various embodiments of the disclosed roping simulator can include spring loaded collapsible legs, a spring loaded tongue, and/or shoulders and head portions formed from a soft, hide-like material.

In some embodiments, the disclosed simulator further includes a suit or wrapping that can be installed over the steer body 106 and/or shoulders 108. In these embodiments, the suit or wrapping is made from a stretchable material, such as neoprene, and creates tension among the parts of the roping simulator that simulate the animal. In addition, in these embodiments, some of the aesthetically inaccurate portions (such as body mount points and joints) will be hidden by the suit or wrapping. In various embodiments, the suit or wrapping still further simulates the skin and muscles of an animal, such that the surface with which the roper's rope interacts is as realistic as possible.

The above description of is exemplary of the features of the system disclosed herein. It should be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claim.

The invention is claimed as follows:

1. A roping simulator comprising:
   (a) a body portion having:
      (i) a rear portion resembling an appearance of a body of a roping animal, the rear portion pivotable in a first direction when a centrifugal force is generated,
      (ii) a head portion resembling an appearance of a head of the roping animal, the head portion pivotable in a second direction when a force other than the centrifugal force is applied to the head portion,
      (iii) a body return spring biasing the body portion toward a body non-pivoted position, and
      (iv) a head return spring biasing the head portion toward a head non-pivoted position, wherein when the body portion is in the body non-pivoted position and the head portion is in the head non-pivoted position, the body portion and the head portion are aligned with one another; and
   (b) a sled portion connected to the body portion, the sled portion including a coupler for coupling to a vehicle such that when coupled, the vehicle pulls the sled portion and the body portion to simulate both forward movement of the roping animal and turning movement of the roping animal, said coupler configured such that when the vehicle turns, a generated centrifugal force causes the rear portion to pivot in the first direction, wherein whether the rear portion pivots in the first direction is regulated only by the body return spring and a pivot stop.

2. The roping simulator of claim 1, wherein the head portion includes a first head portion pivot providing for rotational movement of the head portion, and a second head portion pivot providing for vertical movement of the head portion.

3. The roping simulator of claim 2, which includes at least one spring to bias the head portion to a neutral rotational position.

4. The roping simulator of claim 2, which includes at least one spring to bias the head portion to a neutral vertical position.

5. The roping simulator of claim 1, wherein the pivot stop limits the amount the rear portion can pivot to approximately 70 degrees from a center line parallel to a forward direction of the roping simulator.

6. The roping simulator of claim 1, wherein the pivot stop limits the amount the rear portion can pivot to approximately 70 degrees from a center line in the first direction and to approximately zero degrees from the center line in an opposite direction to the first direction, wherein the center line is parallel to a forward direction of the roping simulator.

7. The roping simulator of claim 1, wherein the pivot stop limits the amount the rear portion can pivot to approximately 70 degrees from a center line in the first direction and to approximately 70 degrees from the center line in an opposite direction to the first direction, wherein the center line is parallel to a forward direction of the roping simulator.

8. The roping simulator of claim 1, wherein the first direction is the same as the second direction.

9. The roping simulator of claim 1, which further includes a leg portion connected to the body portion, the leg portion including a pair of leg components and a spring biasing the leg components away from one another.

10. The roping simulator of claim 9, which further includes a motor connected to the body portion for imparting a hopping movement on the leg portion.

11. The roping simulator of claim 1, which includes at least one body covering attached to the body portion.

12. The roping simulator of claim 1, which includes a plurality of wraps to resemble the appearance of a cow.

* * * * *